United States Patent [19]

Coffey

[11] Patent Number: 4,470,140
[45] Date of Patent: Sep. 4, 1984

[54] DISTRIBUTED SWITCHING NETWORK

[76] Inventor: Dennis K. Coffey, 555 W. Middlefield Rd., Apt. R105, Mountain View, Calif. 94043

[21] Appl. No.: 192,641

[22] Filed: Sep. 30, 1980

[51] Int. Cl.³ .............................................. H04J 3/16
[52] U.S. Cl. ..................................... 370/86; 370/89; 370/95; 340/825.05
[58] Field of Search ....................... 370/85, 86, 89, 87, 370/88, 90, 91, 92, 93, 53, 95, 67; 340/825.05

[56] References Cited

U.S. PATENT DOCUMENTS

| | | | |
|---|---|---|---|
| 3,781,478 | 12/1973 | Blahut et al. | 370/86 |
| 3,790,717 | 2/1974 | Abramson et al. | 370/89 |
| 3,846,587 | 11/1974 | Schenkel et al. | 370/86 |
| 3,856,993 | 12/1974 | Closs et al. | 370/86 |
| 4,140,877 | 2/1979 | Soslow et al. | 370/67 |
| 4,144,410 | 3/1979 | Flickinger et al. | 370/89 |
| 4,227,178 | 10/1980 | Gergaud et al. | 370/85 |
| 4,236,245 | 11/1980 | Freeny et al. | 370/89 |
| 4,271,506 | 6/1981 | Broc et al. | 370/89 |
| 4,352,180 | 9/1982 | Schulze | 370/95 |
| 4,360,910 | 11/1982 | Segal et al. | 370/85 |

Primary Examiner—Gerald L. Brigance
Attorney, Agent, or Firm—Alan H. MacPherson; Steven F. Caserza; Richard Franklin

[57] ABSTRACT

A communications system includes a transmission medium for carrying signals divided into frames, with each frame being divided into time slots. At least three interface units interface selected equipment to the transmission medium. Each of the at least three interface units is capable of receiving selected signals carried on the transmission system and of delivering intermediate signals derived from these selected signals to a corresponding one of the selected equipment, and of transmitting second signals to the transmission medium. Each of the interface units is connected in parallel to the transmission medium such that the failure of one or more of the interface units does not prevent the remaining interface units from operating. To make possible the parallel connections, common timing references are provided for the transmit line and common timing references are also provided for the receive line.

21 Claims, 35 Drawing Figures

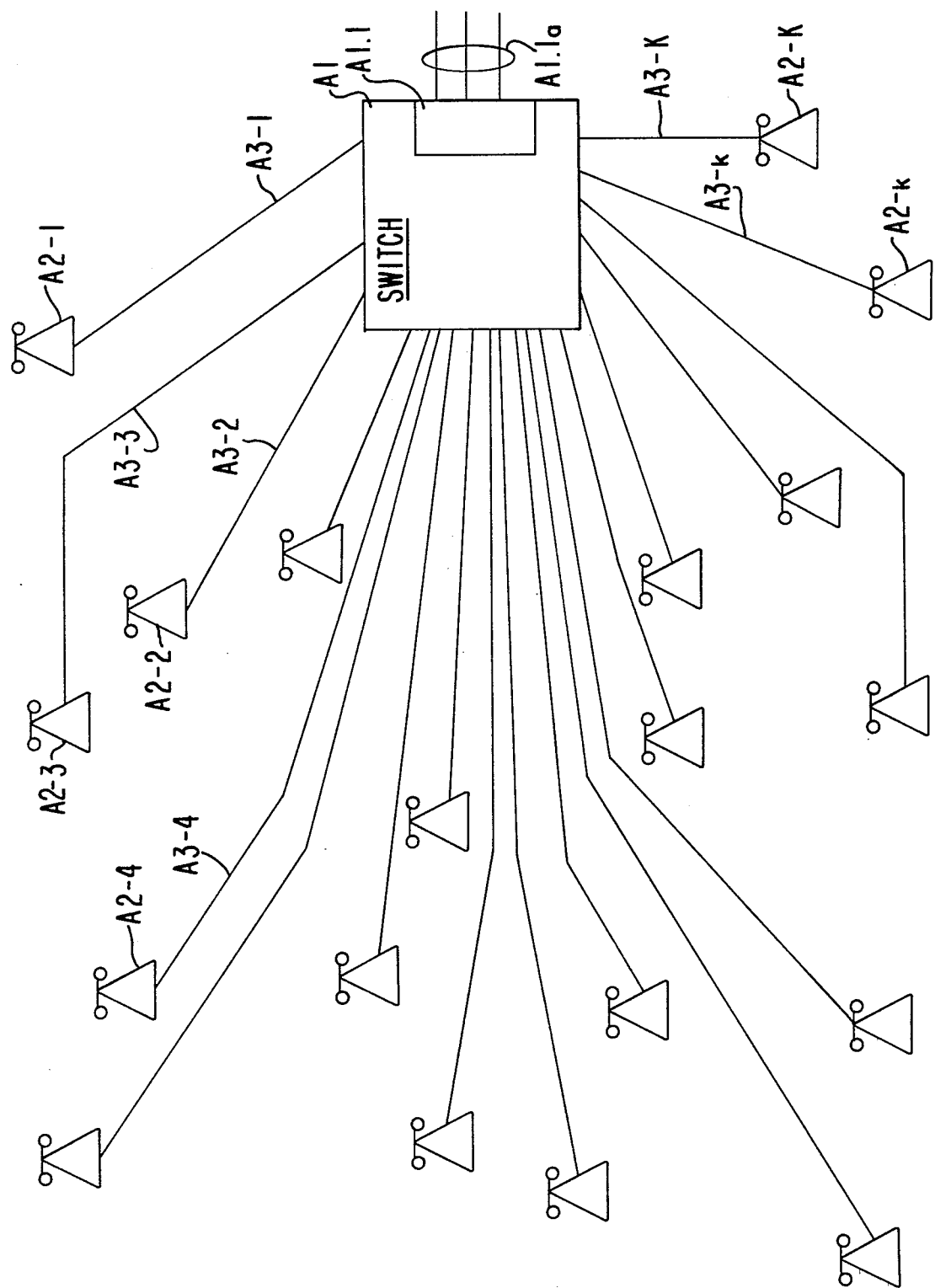
FIG. 1a: CONVENTIONAL TELEPHONE SWITCHING SYSTEM A0
PRIOR ART

FIG. 1b: LOCAL DATA NETWORK B0
PRIOR ART
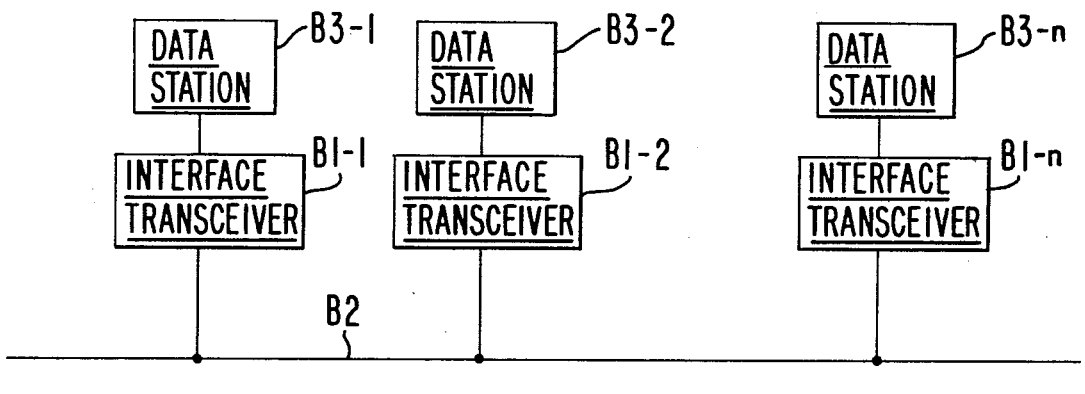
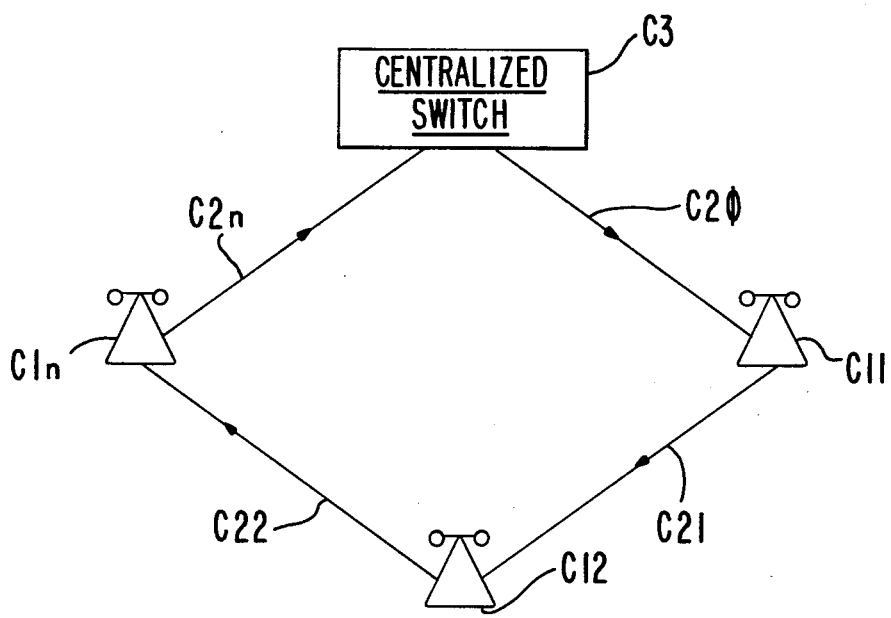
FIG. 1c: SERIAL RING TELEPHONE INTERCONNECTION C0
PRIOR ART

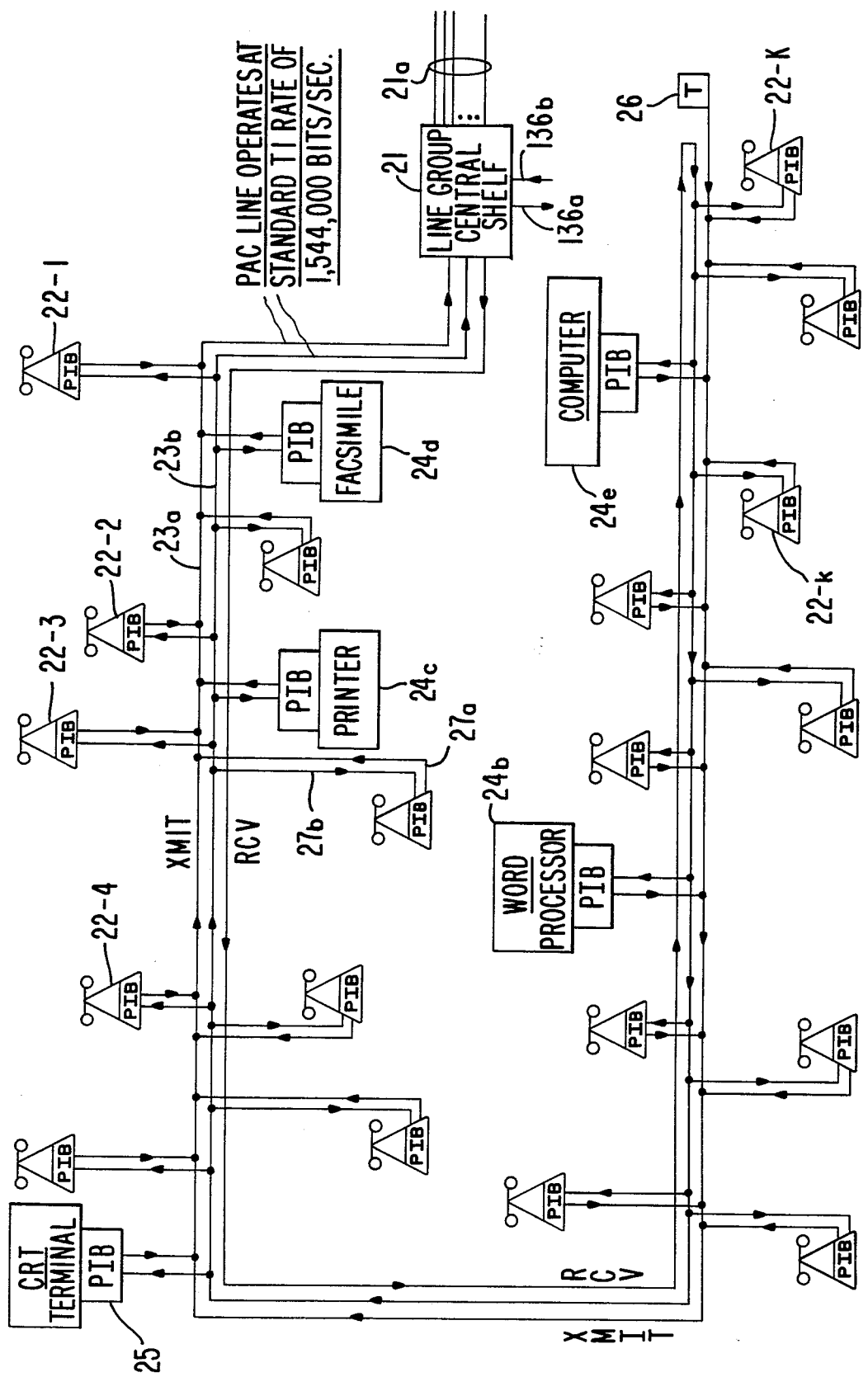
FIG. 2 DISTRIBUTED SWITCHING NETWORK PAC LINE GROUP EMBODIMENT 20

DSN PAC LINE EMBODIMENT EXAMPLES
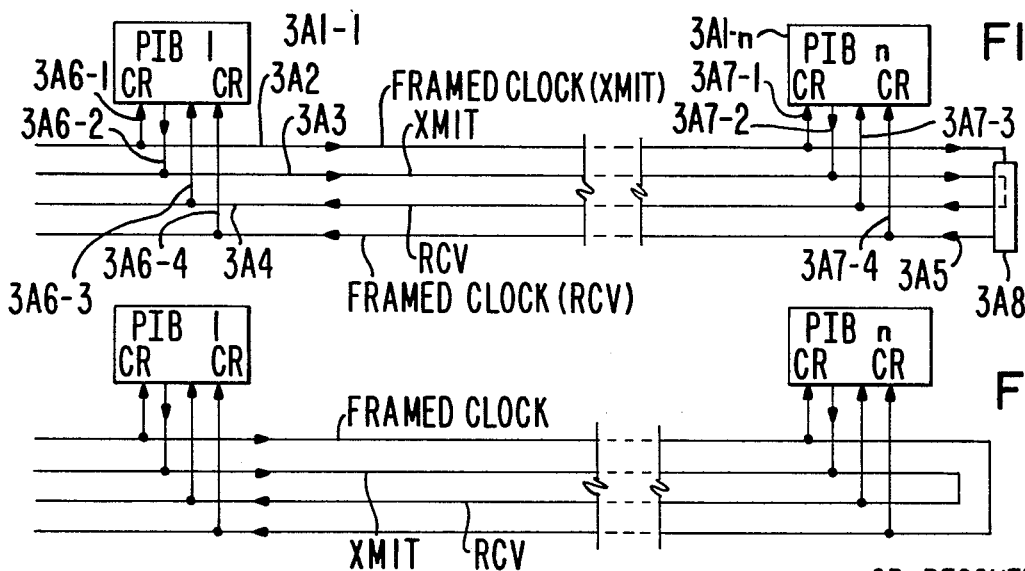
FIG. 3a
FIG. 3b
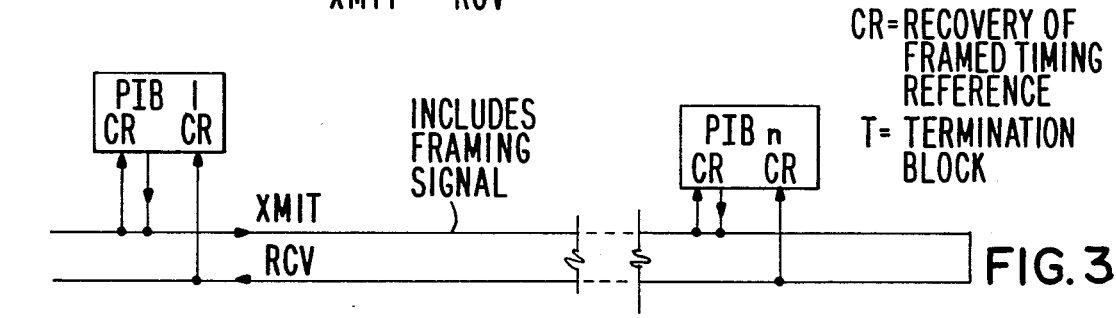
FIG. 3c
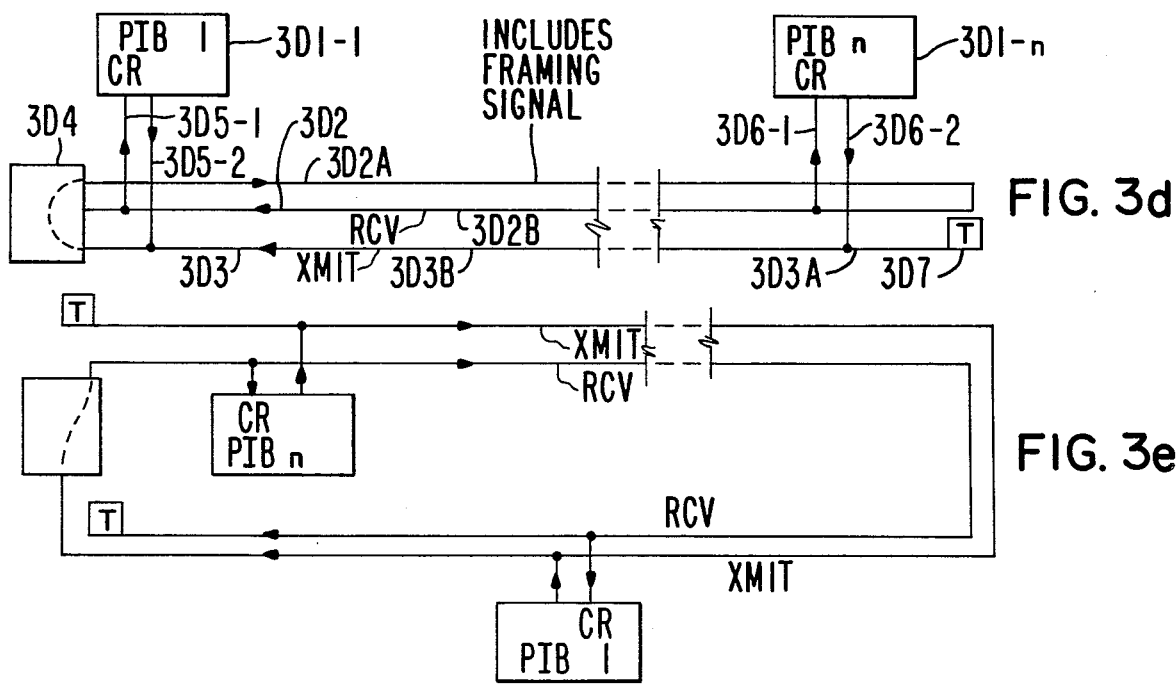
FIG. 3d
FIG. 3e

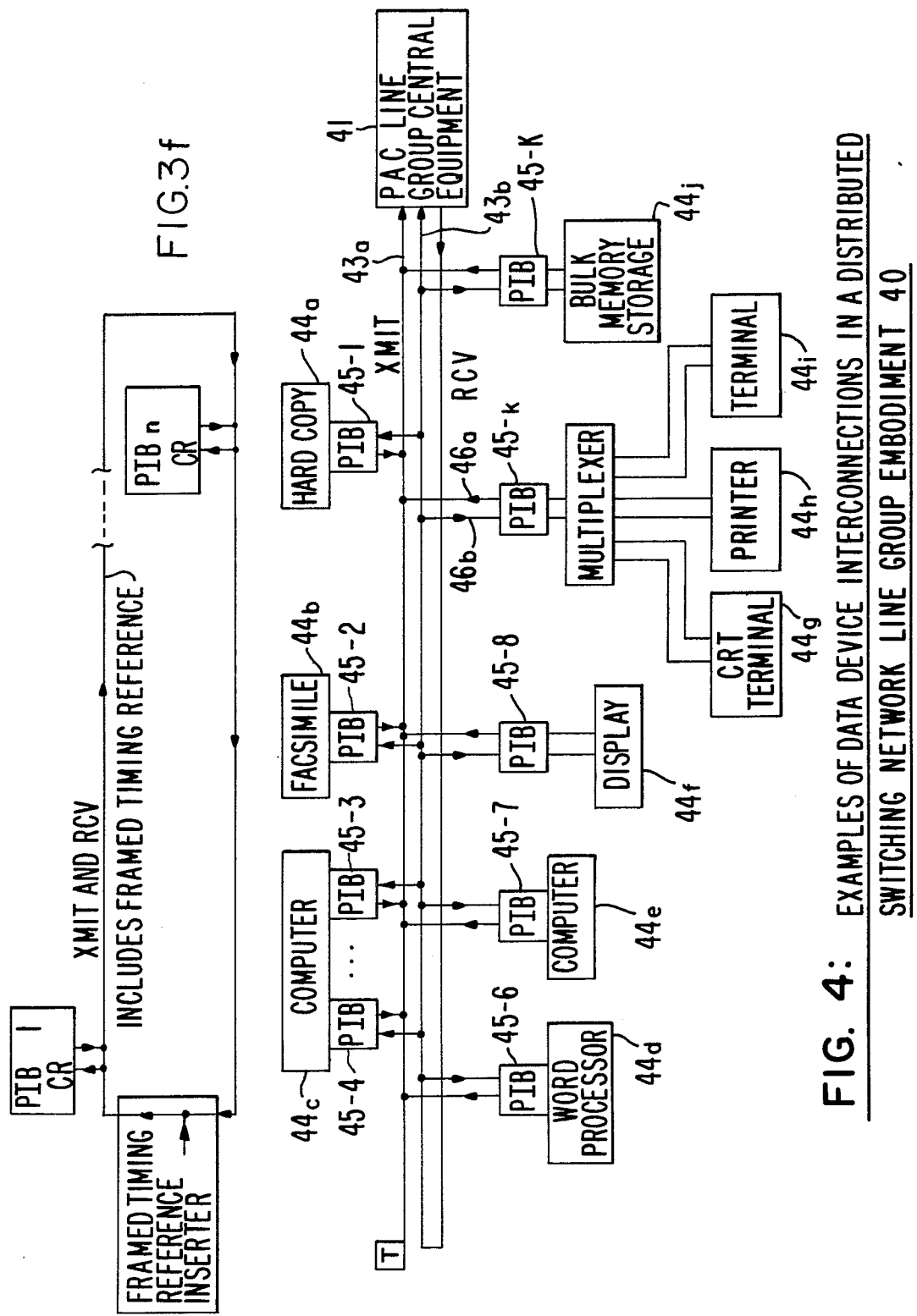

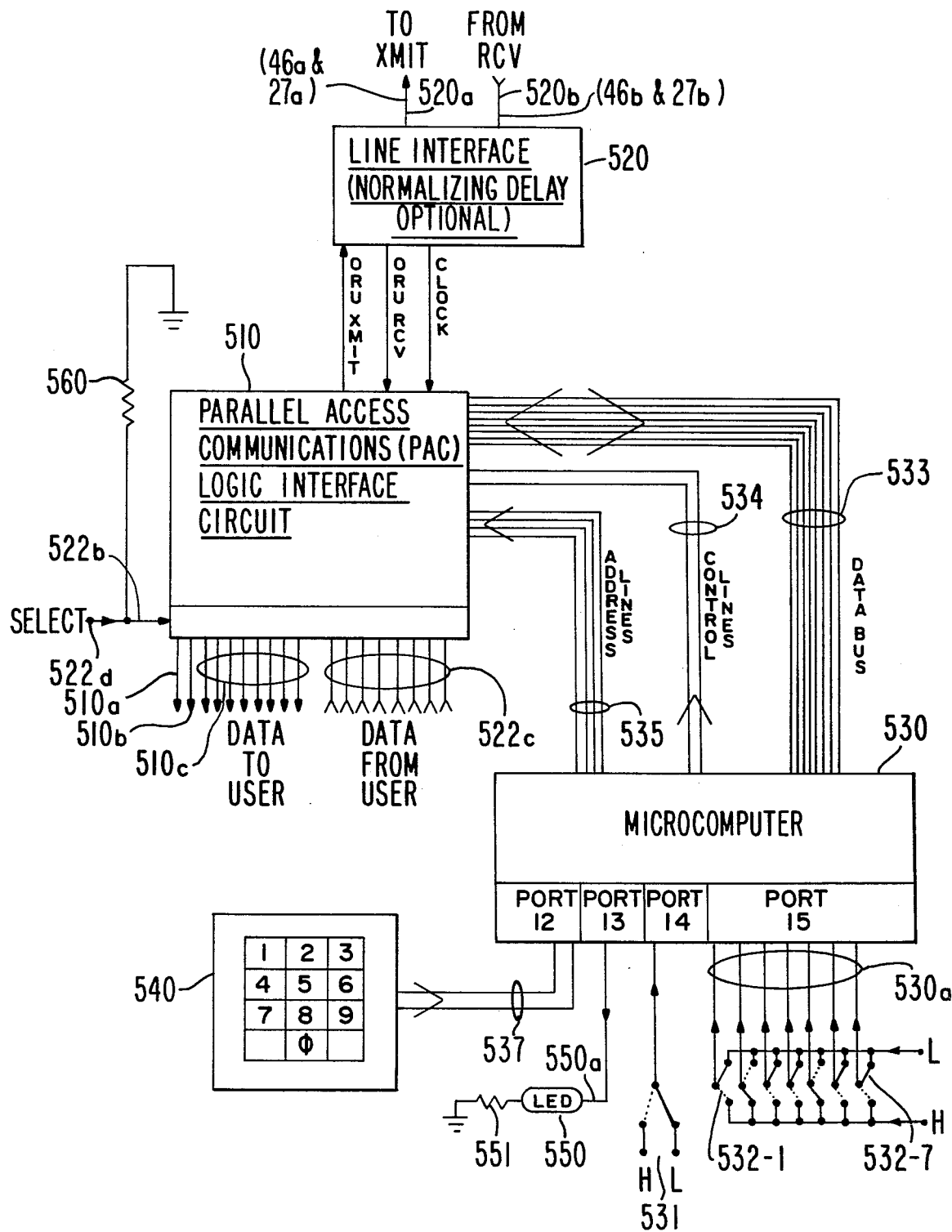
FIG. 5: PAC INTERFACE BLOCK 45 (AND 25)

TIME SLOT DEFINITION AND COUNTER 518 (SEE FIG. 6)

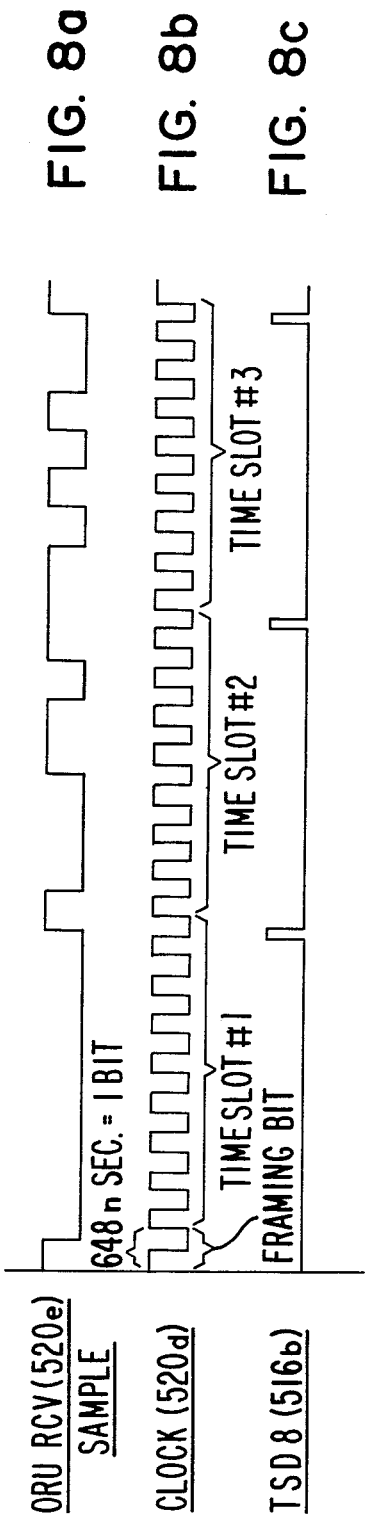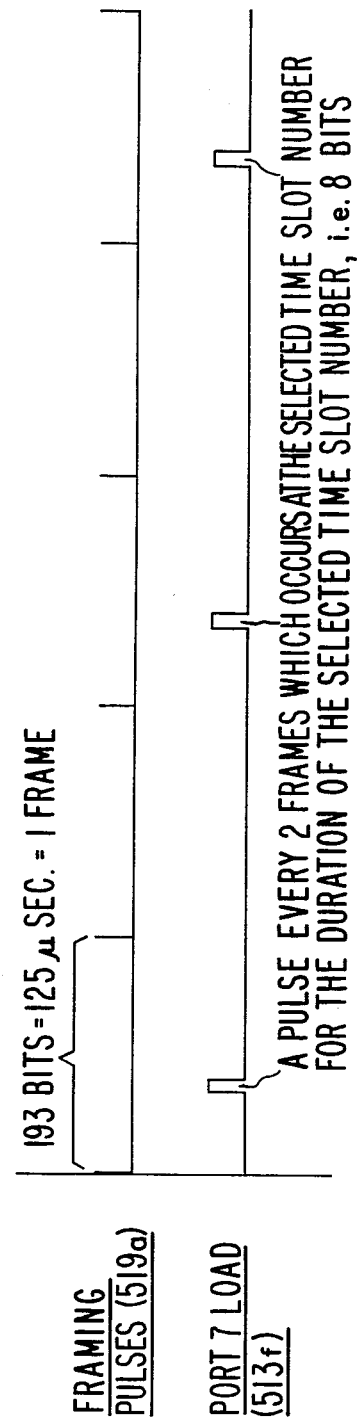

NAME SEARCH AND TIME SLOT LOCK 515
(SEE FIG. 6)

DATA AND CODE READ 514
(SEE FIG. 6)

DATA, CODE, AND NAME WRITE 513 (SEE FIG. 6)

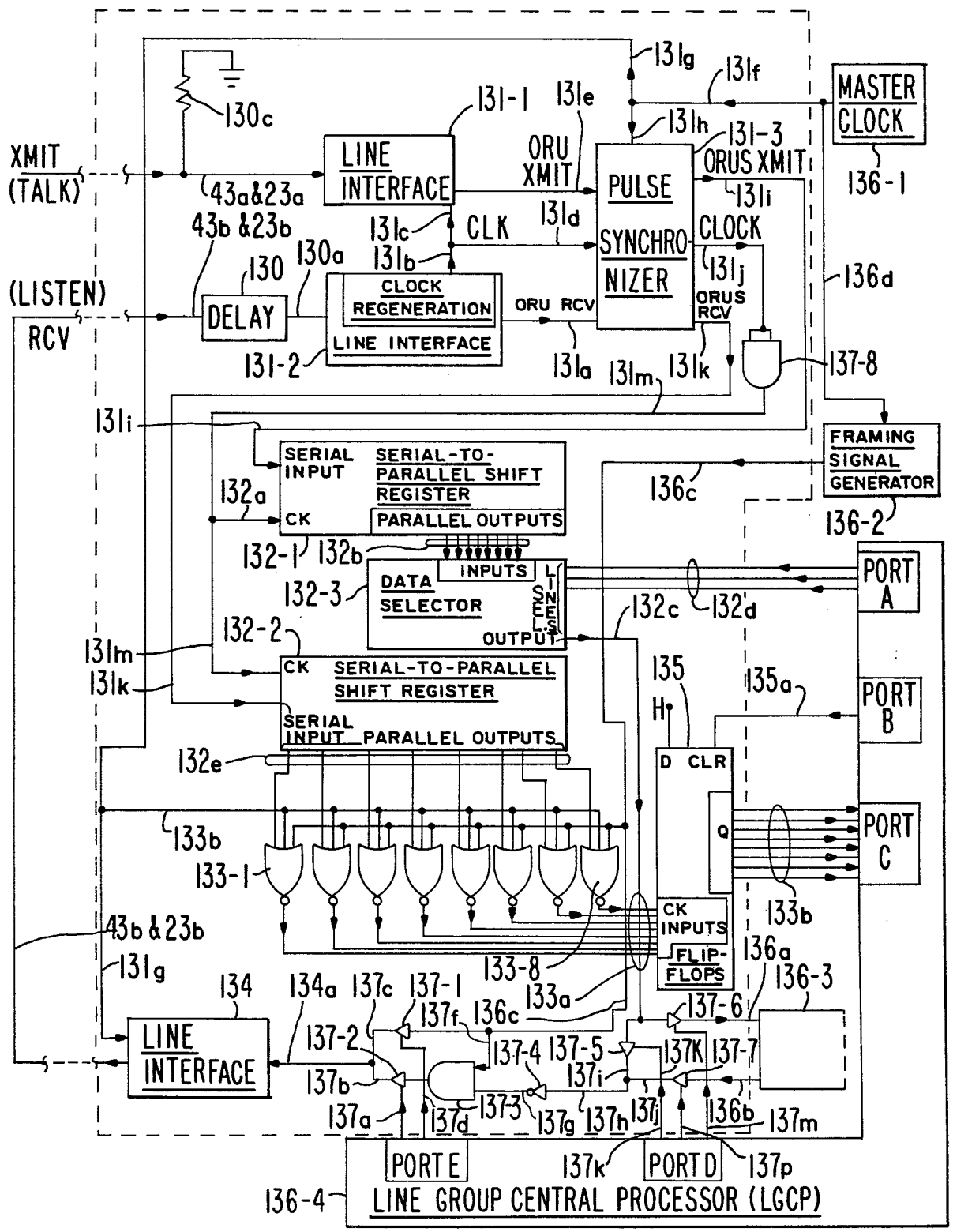

PAC LINE CENTRAL EQUIPMENT INTERFACE CIRCUIT 410 WAVEFORMS

ORU RCV (131a) SAMPLE — FIG. 14a
ORU XMIT (131e) SAMPLE — FIG. 14b
CLK (131b) — FIG. 14c
MASTER CLOCK (131f) — FIG. 14d
ORUS RCV (131a) — FIG. 14e
ORUS XMIT (131i) — FIG. 14f
CLOCK (131j) — FIG. 14g

FRAMING SIGNAL (136c) – FRAME BITS (EACH 193rd BIT) SHOWN; ALL OTHER BITS ARE 1

FRAME # 1 2 3 4 5 6 7 8 9 10 11 12 1 2

FIG. 14h

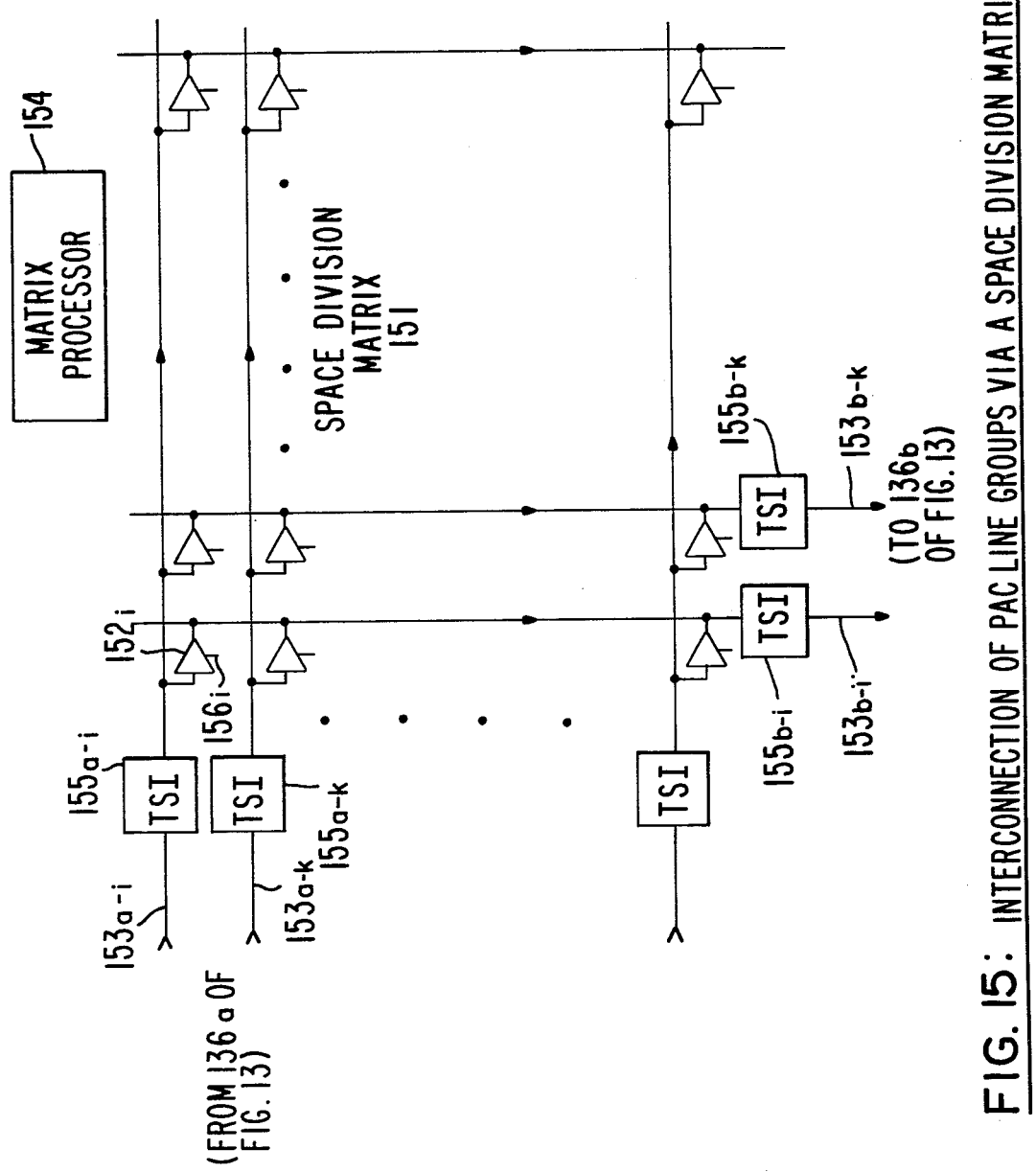
FIG. 15: INTERCONNECTION OF PAC LINE GROUPS VIA A SPACE DIVISION MATRIX

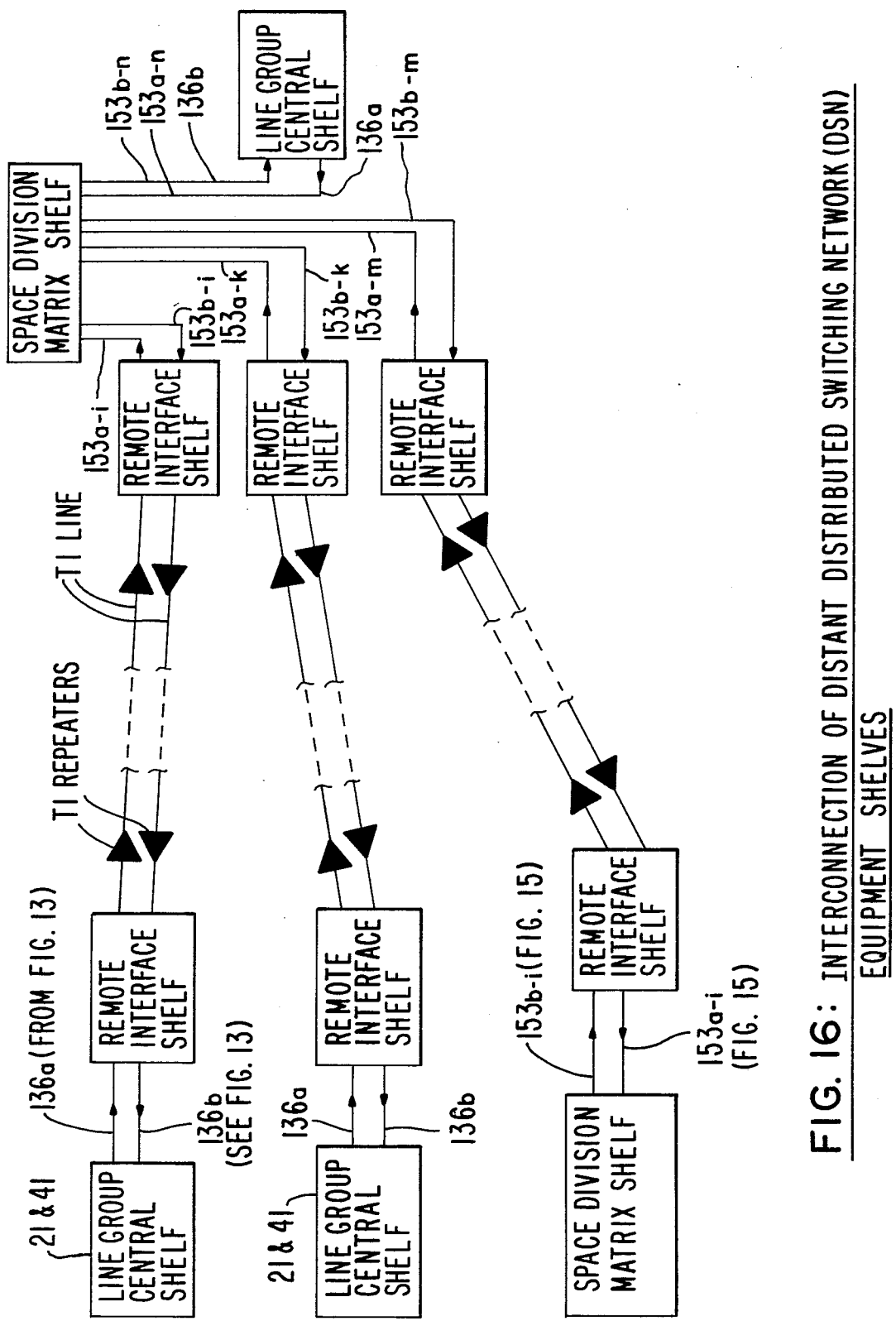
FIG. 16: INTERCONNECTION OF DISTANT DISTRIBUTED SWITCHING NETWORK (DSN) EQUIPMENT SHELVES

DISTRIBUTED SWITCHING NETWORK

BACKGROUND OF THE INVENTION

1. Field of the Invention

This invention relates to a digital switch and device interconnection system for use in communications. More particularly this invention relates to a communications system capable of integrating voice and data communications in a single network system.

2. Prior Art

A conventional business telephone switching system such as shown in FIG. 1a uses individual analog lines such as line A3-k, to connect each telephone, such as telephone A2-k, to a centrally located, expensive digital or analog switch A1, where k is a selected integer which can vary from 1 to K. Thus to make a telephone call, the analog signal from a given telephone A2-k is transmitted over one or more wire pairs A3-k to the central switch A1 and there routed to the receiving telephone, such as telephone A2-1. If central switch A1 is digital, it digitizes the incoming analog signal by means of a device known as a "codec" and transmits a digital signal, either to trunk interface A1.1 for transmission to another switch (if the addressed telephone is not handled by switch A1), or else to another part of switch A1 which converts the outgoing signal back to analog form via a codec and sends the analog signal to the addressed telephone via one or more wire pairs such as A3-1. In the conventional switching system such as shown in FIG. 1a, an expensive centralized switch A1 is required for connecting any telephone to any other telephone which it wants to call. This switch has a separate input port for connecting to the switch each telephone via an analog connection. Within switch A1 are pathways to connect each telephone port to every other telephone port. The type of pathway used depends upon the type of switch. For example, if switch A1 is a modern digital switch, the analog inputs from the telephones are digitized after they enter the switch and a technique called "time division multiplexing" is used in defining the pathways which connect one telephone to another. Switch A1 contains a complex matrix structure of a known design to allow each telephone to call any other telephone. If switch A1 is a modern "stored program controlled" switch, a sophisticated computer within switch A1 handles all calls. This computer requires extensive and complex software to perform its functions such as monitoring for off-hook and signalling information from its various telephones, and allocation of dial-tone, busy-tone, and ringing, etc. to its telephones. The operation of a stored program controlled digital switch of the type described above is well known and will not further be described here. However, the important features of a conventional stored program controlled digital switch are:

1. The telephones connect to the switch via separate analog channels.
2. The signals on the analog channels are converted to digital signals inside the switch.
3. The switch is complex and therefore expensive.
4. The computer that controls the switch must perform a complex series of tasks for all of the telephones and therefore requires expensive and extensive software.
5. Elaborate wiring is required to connect a multitude of telephones to a complex and expensive centralized switching structure.
6. This switching system does not efficiently support digital data communications.

Conventional voice communications switching systems such as illustrated in FIG. 1a are not optimal for digital data communications. Digital data communications devices such as CRT terminals can be used with such a system by converting their digital signals to analog format via a "modem" and by transmitting these analog signals to the switch via dedicated wire pairs. However, modems are expensive and are primarily useful for low speed data communications at 9600 bits per second or less. It is inefficient to convert a digital data signal to analog format for transmission, but data communications using a conventional switching system which interconnects telephones must operate within the constraints of that system. An alternative is to use a separate data communications local networking system such as the Ethernet system of Xerox Corporation or the Z-net system of Zilog, Inc. for data communications. But although these new data networking systems enable distributed data communications they have serious limitations. One primary limitation is the fact that these systems cannot be used effectively for real time interactive voice communications.

The general structure of current state-of-the-art local data networking systems such as the Ethernet and Z-net systems is illustrated in FIG. 1b by local data network B0.

Coaxial cable B2 provides a single channel pathway for interconnection of a number of interface transceivers, B1-1 through B1-n. Each interface transceiver connects to a data station such as B3-1. The various data stations in the network communicate with each other digitally using a technique known as "packet switching" in a broadcast mode, according to the following simplified procedure:

To contact a data station B3-1 another data station B3-n will read from the communications channel constituted by coaxial cable B2 via its interface transceiver B1-n, to see if the channel is idle; i.e., to see if any other data station is transmitting on the channel. If the channel is idle, data station B3-n transmits a block of data bits called a packet onto the channel. This packet can then be read by all of the other stations which interface to coaxial cable B2. The packet includes source and destination address fields which specify the calling and called data stations. The packet also includes a stream of data bits intended for the destination data station; for this example it is data station B3-1.

While it broadcasts a packet into the communication channel of cable B2, data station B3-n reads from the channel via its interface transceiver B1-n. If what it reads is different from what it is transmitting due to contention on the channel caused by another data station transmitting at the same time, data station B3-n must wait for a period of time before retransmitting. If, on the other hand, there is no contention, data station B3-1 which is monitoring the channel will receive the packet and see that its number is in the destination address field. Data station B3-1 then assumes that the stream of data bits in the packet is intended for it.

The prior art local data networking system of FIG. 1b uses parallel connection of packet switched data stations to a common bus. A broadcast packet switched network as described above, although very useful in some strictly local applications, has a number of serious limitations. Foremost among these for the present discussion is the fact that a contention mode packet switched network as described above does not support real time interactive voice communications effectively.

Voice communications switches use a technique known as "circuit switching" in which once a pathway is established through the switch to link one telephone to another, this pathway is maintained for as long as the two users wish to talk. The pathway is dedicated to these two telephones for the duration of the call. This circuit switched pathway may be a metallic connection between the two phones or it may include a time division multiplexed channel as is done in modern digital switches.

In the distributed data networking system illustrated in FIG. 1b, information is exchanged in packets and dedicated pathways are not established between devices. Such packet switched systems do not handle voice effectively and are therefore restricted to data communications.

Up to the present time circuit switched systems have depended on a complex centralized switching structure with the many disadvantages discussed previously.

A serial "ring" distribution method as illustrated in FIG. 1c has been considered in the prior art for integrating a new key telephone set into a centralized switching system. In this method a number of telephones C11, C12, . . . , C1n are connected in series with a pair of wires used to connect each telephone to the next telephone in the ring; e.g., wire pair C21 connects telephone C11 to telephone C12. A circulating high speed digital signal is sent to each telephone via wire pairs C20, C21, . . . , C2n. The digital signal is divided into time slots with one time slot assigned to each telephone, and one time slot used for control signals between the telephones and centralized switch C3. Each telephone receives the digital signal on the wire pair which connects it to the preceding telephone in the ring, extracts the bits in its time slot, inserts any new bits it wishes to transmit, regenerates the digital signal, and outputs the signal to the wire pair which connects it to the next telephone in the ring.

A serial ring architecture as described above has serious deficiencies. Among these is the fact that failure of one telephone in the ring will result in failure of the entire ring. Also, when a telephone has failed and disrupted the entire ring, it is difficult to determine which telephone has failed since communication is no longer possible through the ring. Additionally, the number of telephones that can be supported is restricted by the number of time slots available.

A communications system which eliminates the above and other disadvantages of these prior art communications systems is required.

SUMMARY OF THE INVENTION

In contrast to the above described architectures relating to conventional telephone switching systems or data networking systems, this invention provides a relatively simple and inexpensive but more powerful communication system.

In accordance with this invention a distributed switching network (hereinafter a "DSN") is provided which requires no complex centralized switch and no expensive central computer with its associated software to interconnect telephones. The system of this invention, in contrast to the prior art digital switch, provides:

1. The interfacing of telephones to the network digitally via interface devices for parallel access communications (PAC) referred to hereinafter as "PAC interface blocks" (PIBs) incorporated into the telephones, and high speed circuit switched digital connections between all of these PAC interface blocks (using an industry standard digital transmission format in the preferred embodiment).
2. The digitizing of voice signals within each telephone.
3. The inclusion within each PIB of a microcomputer of a type well known in the art (single or multi-chip microcomputer or similar structure) together with a relatively inexpensive logic interface circuit for handling all calls involving the particular PIB in which these components are installed.
4. Relatively simple software for each microcomputer which need cover only the requirements of the single host PIB.
5. A small and relatively inexpensive central equipment shelf which connects to each PIB via a multiplexed bus and simple wire interface.
6. The integration of voice communications and high speed data communications in a single low cost network, with both voice and data devices interfacing to the network via the same parallel access structure.

The structure of this invention includes a high speed digital connection to the intelligent telephones of this invention to yield a significant communication capability. The system of this invention is capable of interconnecting data communication devices as well as voice communication devices in a single digital communications network. The system thus can be used for voice, data, or combined voice and data communications applications. Unlike prior art digital switches and data networking systems as discussed above, the system of this invention is able to provide a cost-effective parallel access circuit switched high speed digital communication link to every communication unit (whether telephone or data procesing equipment) in the system.

In accordance with this invention a typical telephone includes a PAC interface block (PIB) which in turn includes a single chip microcomputer such as the Intel 8048, a line interface, a parallel access communications logic interface circuit, power supply and battery backup (of standard design, but optional) and a key pad, PC board, optional LED's or other visual displays and miscellaneous small components. The telephone, in addition to the PIB, includes a codec such as the Intel 2910A together with the 2912 filter chip or equivalent and a telephone shell hook switch, hand set and ringer (the telephone shell, for example, can be the ITT 500 type or equivalent).

In accordance with this invention up to 50 DSN "line groups" of up to 128 telephones and/or data devices each (for convenience in numbering this can be restricted to 100 devices) can be interconnected to produce a single DSN network with total capacity exceeding 5,000 lines (where the word "line" refers to one telephone or digital device). Each of these 50 line groups can be located in a separate facility, if desired. Industry standard T1 digital transmission lines are all that is needed to interconnect the various remote sites. Each telephone and data device in these line groups can communicate with each of the other telephones and data devices over this distributed switching network as if they were all located at the same site. The result is a system which greatly reduces cost and increases the quality of communication service. In accordance with this invention not only is the quality of voice communications improved over that of prior art systems but the system effectively provides a high speed digital connection to each user at a lower cost than do prior art systems. Thus the system can handle both voice and data communications optimally in a single low cost network.

This invention will be more completely understood in light of the detailed description taken in conjuction with the drawings.

DESCRIPTION OF THE DRAWINGS

FIG. 1a shows schematically a conventional prior art telephone system using either an analog or digital switch.

FIG. 1b shows schematically a local data networking system in the prior art.

FIG. 1c shows schematically a prior art system employing the serial ring distribution method.

FIG. 2 shows the line group division of the distributed switching network of this invention including data service connections such as word processors, cathode-ray tube terminals and printers, facsimile transmitters and computers interconnected with voice communications terminals on the same network and using a standard digital transmission format such as T1 PCM.

FIGS. 3a-3f illustrate schematically several embodiments of the parallel access communications line group structure of this invention.

FIG. 4 shows another example of data device interconnections possible in the Distributed Switching Network in accordance with this invention using one parallel access communications line group.

FIG. 5 shows components of the parallel access communications (PAC) interface block used in this invention.

FIGS. 8a to 8e illustrate wave forms showing the relationship between time slot delineating signals and clocking signals, framing pulses and certain load pulses.

FIG. 13 shows the parallel access communications line central equipment interface circuit.

FIGS. 14a-14h show certain parallel access communications line central equipment interface circuit wave forms.

FIG. 15 shows a structure for interconnecting a number of parallel access communications line groups.

FIG. 16 shows the interconnection of dispersed Distributed Switching Network sites via T1 lines.

DETAILED DESCRIPTION

1. Definitions

Figure 6:
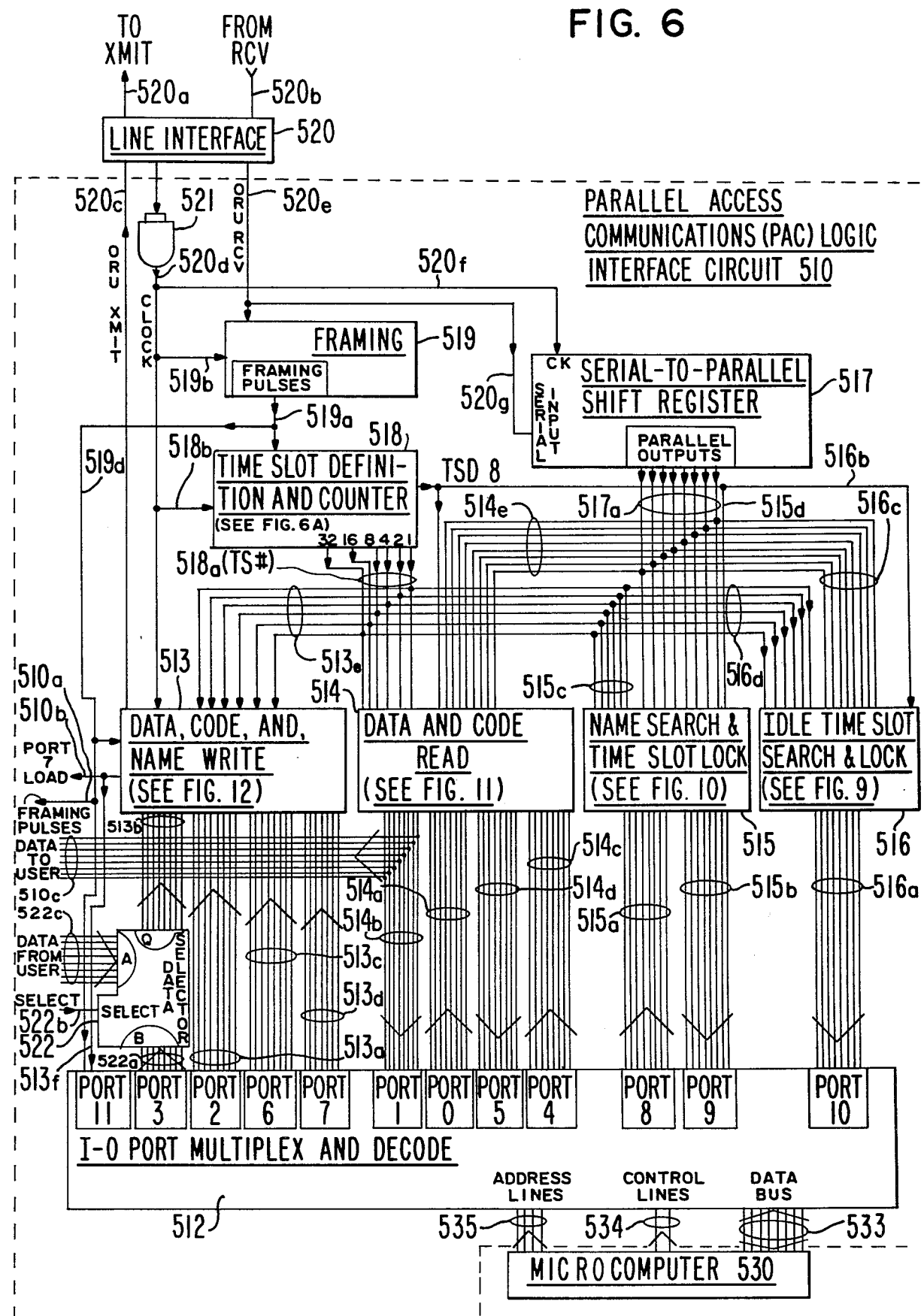
FIG. 6 shows the parallel access communications (PAC) logic interface circuit of FIG. 5.

The following abbreviations are used in this application
BCD=Binary Coded Decimal
CVB=Code Verification Byte
DSN=Distributed Switching Network
IS&L=Idle Time Slot Search and Lock
LGCP=Line Group Central Processor
MSB=Most Significant Bit
NACK=Name Acknowledge Signal
NAME=Code Identifying One Specific Piece of Equipment
NS&TSL=Name Search and Time Slot Lock
NVB=Name Verification Byte
ORU=One Rail Unipolar
PAC=Parallel Access Communications
PCM=Pulse Code Modulation
PIB=PAC Interface Block
PM&D=Port Multiplex & Decoder
RCV=Receive Line
TSD=Time Slot Definition
TS#=Time Slot Number
XMIT=Transmit Line

2. Description

While a specific embodiment of this invention will be described in conjuction with the drawings, it should be understood that this description is meant to be exemplary only and is not intended to limit the scope of the invention.

FIG. 2 illustrates the "line group" division of the Distributed Switching Network (DSN) in accordance with this invention and gives examples of digital devices which can be interconnected via the DSN. FIG. 2 shows a structure for tying equipment such as computer 24e, peripherals such as printer 24c, and other digital devices such as CRT terminal 24a, word processor 24b and facsimile device 24d into the communications network tied together by PAC line configuration 23a, 23b. A preferred embodiment of the PAC line structure of this invention is illustrated in FIG 2.

The PAC line structure of this invention is further illustrated in FIGS. 3a-3e, where a number of illustrative embodiments are shown. Key features of the PAC line structure are the following:

(1) The PAC line structure comprises transmit (XMIT) and receive (RCV) lines which each carry a digital signal which is divided into frames having multiple time slots.

(2) A framed timing reference signal is provided on the XMIT line or on another line which is routed with the XMIT line from its first PIB tap-off to its last (see (5) below) and which has signal flow in the same direction as the XMIT line over this distance.

(3) A framed timing reference signal is provided on the RCV line or on another line which is routed with the RCV line from its first PIB tap-off to its last (see (5) below) and which has signal flow in the same direction as the RCV line over this distance.

(4) The time slot signals on the XMIT line are doubled back to the RCV line, or they are otherwise capable of being inserted into RCV time slots selectively via a central equipment interface circuit.

(5) Two or more PAC interface blocks (PIB) connect to the PAC line by tapping off the XMIT and RCV lines and the framed timing reference lines described in (2) and (3) above.

(6) Each PIB recovers framing from its XMIT line framing reference and uses this signal as a reference for time slot transmission it makes to the XMIT line.

(7) Each PIB recovers framing from its RCV line framing reference and uses this signal as a reference for properly dividing the information it reads from the RCV line into time slots.

Each PIB can thereby communicate with other PIB's connected to the PAC line.

FIGS. 3a–3f illustrate several embodiments of the PAC line structure of the present invention, in accordance with the above rules for PAC line structure.

In FIG. 3a XMIT line 3A3 and RCV line 3A4 carry digital signals divided into frames having multiple time slots as specified in item (1) above. A separate line 3A2 is used for the framed clocking reference for the XMIT lines 3A3 in fulfillment of requirement (2) above, and a separate line 3A5 is used for the framed clocking reference for the RCV line 3A4, fulfilling requirement (3). The framed clock signals in each case constitute a digital bit stream divided into frames by one or more framing bits. A framed clock reference signal can be inserted on line 3A2 at any point upstream of its most upstream PIB tap-off. Therefore the insertion point is not shown in the figure for line 3A2. Some or all of the time slots from XMIT line 3A3 are injected back on RCV line 3A4 via central interface 3A8 in correspondence with timing reference 3A5 thereby fulfilling requirement (4) above. PIB PAC line tap-offs 3A6-1, 3A6-2, 3A6-3, 3A6-4, 3A7-1, 3A7-2, 3A7-3, and 3A7-4 fulfill requirement (5). Framing is recovered in PIB 3A1-1 from the signals on tap-off line 3A6-1, and framing is recovered in PIB 3A1-n from the signals on line 3A7-1 in fulfillment of requirement (6). Framing is recovered in PIB 3A1-1 from the signals on tap-off line 3A6-4, and framing is recovered in PIB 3A1-n from the signals on tap-off line 3A7-4 in fulfillment of requirement (7).

Minor changes in embodiment 3a can produce other embodiments of this invention. For example, line 3A5 can be removed by placing its reference timing signals on RCV line 3A4.

FIG. 3b is the same as FIG. 3a except that the XMIT framed reference clock line 3A2 has been doubled back on RCV frame reference clock line 3A5 so that the framed reference signal applied to line 3A2 will also flow through line 3A4, XMIT line 3A3 has been doubled back on RCV line 3A4, and central interface 3A8 has been eliminated.

In FIG. 3c the framed timing reference signal is routed on the XMIT line and RCV line.

FIG. 3d shows a preferred embodiment of the PAC line structure of this invention. This embodiment is also shown in FIGS. 2 and 4, and it is used as the basis for the detailed embodiment description which follows. In FIG. 3d the framing reference is inserted onto the RCV line 3D2 which is then routed from central equipment interface 3D4 in a looped back fashion so that the RCV line 3D2 contains signal flow in the same direction as the XMIT line 3D3 at all PIB tap-off points. The PIB PAC line tap-offs 3D6-1 and 3D6-2 to PIB 3D1-n constitute the most upstream tap-offs for RCV line 3D2 and XMIT line 3D3 respectively. The PIB PAC line tap-offs 3D5-1 and 3D5-2 to PIB 3D1-1 constitute the most downstream tap-offs for RCV line 3D2 and XMIT line 3D3 respectively. RCV line 3D2 and XMIT line 3D3 are routed together (so that the XMIT line is the same length as the RCV line between the tap-offs for any two PIBs) and their signals flow in the same direction from tap-offs 3D6-1 and 3D6-2 to tap-offs 3D5-1 and 3D5-2. These XMIT and RCV line sections are labeled 3D3B and 3D2B respectively. Other PIBs can tap-off the PAC line in the same fashion anywhere between these tap-off points for PIB 3D1-n and PIB 3D1-1, i.e., anywhere along 3D2B and 3D3B. The section of RCV line 3D2 which is upstream of the connection point of PIB tap-off 3D6-1 is represented by 3D2A in FIG. 3. Section 3D2A can be routed in any desired fashion, either with or apart from sections 3D3B and 3D2B which are routed together. Section 3D3A of XMIT line 3D3 is that part of XMIT line 3D3 which is above tap-off 3D6-2 (i.e., away from section 3D3B). Routing of section 3D3A is also not critical. Termination block 3D7 prevents the signals on section 3D3A from reflecting back onto section 3D3B. Signals from XMIT line 3D3 are routed back to RCV line 3D2 via central equipment interface 3D4.

FIG. 3e shows a variation of the embodiment shown in FIG. 3d. In FIG. 3e the required routing of XMIT line together with RCV line as discussed above begins closer to the central equipment interface where PIB n taps off the PAC line, and routing of XMIT and RCV sections together (with signal flow in the same direction) is conducted in a loop from the point where the RCV line signals are output to the RCV line from the central equipment interface to the point where XMIT line signals are input to the central equipment interface from the XMIT line. FIG. 3e illustrates the option of terminating the downstream end of the RCV line outside the central equipment interface.

In FIG. 3f the same line is used for both XMIT, RCV, and a timing reference.

The format of the framed signals conducted by the PAC line will vary according to the needs of a particular application. Typical formats would be pulse code modulation (using bipolar or unipolar pulse stream) or delta modulation. The PAC line structure of this invention can be used in application embodiments incorporating any desired transmission rate on the PAC line from low rates to very high rates.

The PAC line structure of this invention can be configured using the various transmission media known in the art, e.g., twisted wire pairs, optical fibers, coaxial cable, etc.

Digital repeaters and buffers using techniques common in the art can be placed at selected points along the PAC line if desired.

PIB tap-offs from the PAC line can be accomplished using common design techniques. High impedance type tap-off interfaces to the PAC line will be desired in many cases to minimize reflections.

PAC line terminations and PIB tap-off terminations can use well-known designs and techniques.

All devices interface to DSN via a PAC interface block (PIB) 25 as shown in FIG. 2. PIB 25 can be incorporated into an interfacing device, as is done in DSN telephone terminals 22, or it can be a stand-alone interface device 25. As a stand-alone device, it allows the user to interface existant computers 24e, terminals 24a, memory devices (not shown), printers 24c, copiers (not shown), facsimile devices 24d, and word processors 24b to the network of PAC line 23a, 23b and enables these devices to communicate over 64 Kb/sec digital channels (in a preferred embodiment) to any other device anywhere on the customer's network. For instance, a CRT terminal 24a in one facility can link directly with a large base of information stored in a computer (such as computer 24e) at a remote network facility.

For those DSN applications which require connection of a private DSN network to other networks, trunks such as represented by leads 21a in FIG. 2 in standard analog or digital format can connect the DSN to telephone company central office equipment or other facilities, other common carriers, or other equipment using well-known designs. If desired, these trunks can interface to the DSN via PIB connections to a PAC line but it is envisioned that for most applications it will be more convenient to tie these trunks into the DSN at DSN central equipment.

Functions such as electronic mail can be enabled using the Distributed Switching Network of this invention. Of importance such functions can be implemented using well-known, commercially available equipment in conjunction with a DSN network comprising PIB's 25, PAC lines 23a, 23b and central equipment 21.

FIG. 5 illustrates the principal circuit blocks comprising PIB 25 and 45 (FIGS. 2 and 4). Of these, the Parallel Access Communications (PAC) Logic Interface Circuit 510 is unique to the DSN.

FIG. 6 illustrates the circuit blocks of the PAC Logic Interface Circuit 510. The interconnection of these blocks will be discussed now. For reference purposes, the ports of the I-O Port Multiplex and Decode block are defined in FIG. 7. The waveforms of signals at various points in the PAC Logic Interface Circuit 510 are shown in FIGS. 8a to 8e.

Framing. Framing techniques and structures are well known in the communication arts. The framing circuit 519 takes its inputs from the 1.544M bit/sec Clock line 520d, which is recovered from RCV line tap-off 520b by the Line Interface circuit 520, and from the one rail unipolar (ORU) RCV line 520e, also derived from the RCV line tap-off 520b by the Line Interface circuit 520.

The transmission format in the distributed switching network of this invention is preferably North American standard T1 based PCM although other formats can also be used if desired. In the T1 format, 24 time slots of 8 bits each are grouped into frames. In addition to the 192 total time slot bits per frame, there is added one "framing bit" per frame as a frame delineator. This gives a total of 193 bits per frame. The transmission rate is 8000 frames/sec which turns out to be 1.544M bits/sec.

In the T1 format the framing bit varies according to two interweaved sequences. The first sequence repeats every four frames. This is the sequence used for framing of the bit stream. (The second sequence repeats every twelve frames and defines a superframe. This is not of concern to us at present.) The framing bit is a 1 in the first frame of a twelve frame superframe. The framing bit is a 0 in the third frame of the superframe. The framing bit changes state in this way every two frames. (In most embodiments of the present invention, delineation of a twelve frame superframe is not required, so interweaving of two sequences by the framing bit can be replaced if desired by a simpler frame delineation sequence.)

The framing circuit 519 of FIG. 6 locks onto the framing bit by watching for a bit that changes state every 386 bits, i.e. every two frames. Framing circuit 519 performs two principal functions: it locks onto the framing bit and it also detects when it has lost frame (which, for example, can result due to noise on the line).

Once frame is lost, framing circuit 519 samples each bit position in the bit stream on ORU RCV line 520e, until a bit position is found which changes state every 386 bits. Framing circuit 519 then locks onto the new framing bit and synchronizes its output of framing pulses to the presence of the framing bits. The operation of framing circuits such as circuit 519 is well known in the art.

The framing circuit 519 outputs a framing pulse bit stream 519a (See FIG. 8d) which consists of a pulse for each framing bit. This signal is delivered to the time slot definition and counter circuit 518 and to Port 11 on lead 519d.

Time Slot Definition and Counter Circuit 518. The Time Slot Definition (TSD) and Counter circuit 518 takes clock and framing pulse input signals and generates time slot definition (TSD) and time slot number (TS#) output signals. Circuit 518 divides the frames delineated by the framing pulse into 24 eight bit time slots. The TS# output signals on leads 518a comprise a six bit parallel output signal which represent in real time each TS# in binary format. The TS# binary output signal changes in response to the leading edge of the first bit of each time slot. It then maintains its state until the beginning of the next time slot. (Only five of the six counter output bits are used for the present 24 channel system. The sixth bit allows circuit 518 to function in a 48 channel system without modification.) The TSD8 output signal on lead 516b (see FIG. 8c) consists of a pulse in the last (i.e. the eighth) bit position of each time slot.

Data, Code, and Name Write Circuit 513. The Data, Code, and Name (D,C,&N) Write circuit 513 takes Clock, TS#, Port 6, Port 7, Framing Pulse, Port 2 and the Q output signals of data selector 522 as input signals and generates the Port 7 load output signal and the ORU XMIT output signal when appropriate.

Port 2 defines the time slot number where it is desired to write a byte of data. The Q output signals of data selector 522 contain the data byte to be written to the time slot indicated by Port 2. The data byte on leads 513b from data selector 522 comes from Port 3 when the select signal on lead 522b is a logical 0 and it is a data byte supplied by the user on leads 522c when the select signal on lead 522b is a logical 1. The data byte on leads 513b is loaded into the D,C,&N Write circuit 513 at the beginning of the TS# indicated by the signal on leads 513a from Port 2, and shifted out serially onto the ORU XMIT line 520c. This occurs once each frame. If it is not desired to write data to any time slot, a value of 25 or greater is placed in Port 2 (since the twenty-four (24) time slots in each T1 frame are numbered 1–24).

The signals on leads 513c from Port 6 define the time slot number where a byte of code or a name is to be written. The byte in Port 7 is latched into the D,C,&N Write circuit 513 at the beginning of the time slot number indicated in the least significant five (5) bits of Port 6 in alternate frames with a code verification byte (CVB) or a name verification byte (NVB) (as defined by the most significant bit of Port 6) as follows:

First a byte from Port 7 is loaded in one frame as mentioned above. It is then serially shifted out on the ORU XMIT line in the time slot indicated by the least significant five bits of Port 6. In the next frame, if the most significant bit (MSB) of the byte being input on leads 513c via Port 6 is a 1, the CVB bit pattern 01111111 is loaded and shifted out in the same time slot indicating that a code is being transmitted. If the MSB of Port 6 is a 0, the NVB bit pattern 00111111 is loaded and shifted out in the same time slot indicating that a name or name acknowledge is being transmitted (i.e. a call to some PIB extension number or an acknowledgement of receipt of such a call). The value of the signal on leads 513d from Port 7 will continue to be transmitted in the time slot specified by Port 6 in alternate frames with CVB or NVB as specified by the most significant bit of Port 6.

A signal labelled "Port 7 Load" is provided as an output to Port 11 from the D,C,&N Write circuit 513. This signal indicates to microcomputer 530 or to the user via output pin 510b when the byte of code in Port 7 is latched into the D,C,&N Write circuit 513.

Serial to Parallel Converter 517. The Serial to Parallel (S-P) Converter, 517 of well known design, takes its input signals from the Clock line 520f and ORU RCV line 520g. It is an 8-bit shift register which serially shifts the bits on the ORU RCV line 520e and continuously outputs in parallel the last eight bits received.

Data and Code Read 514. The Data & Code (D&C) Read circuit 514 takes TS#, TSD8, ORU RCV 8-bit Parallel, Port 0, and Port 4 input signals and produces output signals on leads 514b and 514d associated with Port 1 and Port 5, respectively.

The signal on leads 514a from Port 0 specifies the number of a time slot from which data is to be read. The D&C Read circuit 514 produces on leads 514b associated with Port 1 the data byte contained by the specified time slot. This output signal is updated each frame.

The signal on leads 514c from Port 4 specifies the number of a time slot from which code is to be read. The D&C Read circuit 514 produces on leads 514d associated with Port 5 the code byte contained by the specified time slot, if that time slot in fact has a code present under the requirements given in the analysis of FIG. 11 set forth in a later section.

Name Search & Time Slot Lock 515. The Name Search and Time Slot Lock (NS&TSL) circuit 515 receives the same input signals as the D&C Read circuit 514 above, except for its input signals from the ports of I-O Port Multiplex and Decode circuit 512. Whereas the D&C Read circuit 514 accepts input signals from Ports 0 & 4 and delivers output signals to Ports 1 & 5, the NS&TSL circuit 515 takes input signals from Port 8 via leads 515a and delivers output signals to Port 9 via leads 515b.

The value of the input signal to circuit 515 from Port 8 specifies a name or name acknowledge byte to be searched for by circuit 515 in all time slots. The NS&TSL circuit 515 searches down through all time slots until it finds a time slot containing the byte specified by Port 8 and repeated as follows:

This byte must alternate frames with the NVB pattern (mentioned above) for eight consecutive frames. When a time slot meeting this requirement is found, the number of that time slot is sent to Port 9 via leads 515b. This number will be sent to Port 9 as long as the specified byte is alternated with the NVB pattern. When this condition no longer holds true a value of 11111111 is sent to Port 9 via leads 515b and the search is renewed for the specified byte pattern.

The NS&TSL circuit 515 enables a PIB 25 to monitor its PAC line for occurrence of its NAME (i.e. assigned extension number) or a name acknowledge (NACK) signal. There are eight bits in a name code. Of these, the most significant bit (MSB) when a 1 indicates that the other seven bits represent a NAME and when a "0" indicates that the other seven bits represent a NACK. The remaining seven bits are used to represent 127 possible extension numbers for a line group, with the pattern 00111111 reserved for the name verification byte (NVB).

Actually, only 100 extension numbers will be used for line group devices which use two decimal digits to represent their line group extension numbers (since two decimal digits can only represent 100 possible states). Decimal digits will usually be used for such devices as voice terminals. However, if desired, the user will be able to use the six hexadecimal digits A,B,C,D,E, and F as part of a telephone number, thereby fully utilizing the 127 extension numbers supported for a line group in the invention embodiment being discussed. Alternatively, extension numbers which utilize the above six hex digits can be reserved for non-voice devices.

Idle TS Search and Lock 516. The Idle Time Slot Search and Lock (IS&L) circuit 516 takes the same input signals as the NS&TSL circuit 515, except for its input signals from the I-O Port Multiplex and Decode circuit 512. The NS&TSL circuit 515 takes input signals off leads 515a from Port 8 but the IS&L circuit 516 has no input signals from circuit 512. The IS&L circuit 516 delivers its output signals on leads 516a to Port 10 of circuit 512.

The IS&L circuit 516 conducts a continuing time slot search similar to that described above for the NS&TSL circuit 515. However, instead of searching for a user defined name in any time slot, the IS&L circuit 516 looks for a time slot on the ORU RCV line which contains 64 consecutive repetitions of an idle pattern, chosen to be 00000000.

The IS&L circuit 516 produces an output signal on leads 516a to Port 10 representing the number of an idle time slot it has locked onto. When the repetition requirement mentioned above no longer holds true (i.e. the specified time slot is no longer idle) the search is continued and the value 11111111 is output on leads 516a to Port 10 until an idle time slot has again been locked onto.

I-O Port Multiplex & Decode 512. The Input-Output Port Multiplex and Decode (PM&D) circuit 512, of a type well-known in the art, provides a means for the PIB microcomputer 530 (FIG. 5) to access the ports of the PAC Logic Interface circuit 510 described above via its address bus 535 and data bus 533. By this means the pin-out of the PAC Logic Interface circuit 510 can be kept small. This is important since it is intended that circuit 510 will be implemented as a single LSI chip. Standard multiplex and decode techniques will be used in the PM&D circuit 512 (FIG. 6) to allow the microcomputer 530 (FIG. 5) to access the ports of PM&D circuit 512 mentioned via the standard bus structure of microcomputer 530.

TIME SLOT DEFINITION AND COUNTER (518) (FIG. 6A) DETAILED DESCRIPTION

FUNCTION

Circuit 518 defines time slots based on framing pulses and clock pulses as input signals. Circuit 518 provides TS# output signals which specify the number of the current time slot in the present frame of the bits carried by the ORU RCV line. Each time slot is eight bits long in the embodiment under discussion. Circuit 518 also provides a TSD8 output signal which constitutes a pulse during the last (i.e., eighth) bit position of each time slot, which serves as a last-bit-of-time-slot delineator to other circuit blocks.

SPECIFICATIONS

Counter 6A1 takes the CLOCK input signal on lead 518b as its CNT input. Counter 6A1 counts the transitions from logical 0 to logical 1 of this CNT input signal and produces a corresponding output signal on leads 6A1a, 6A1b, 6A1c, and 6A1d. If the number of these transitions reaches eight before counter 6A1 is cleared by the arrival of a logical 0 at its CLR input lead 6A3a, the output signal on output lead 6A1a from counter 6A1 changes from a logical 0 to a logical 1. The signal on lead 6A1a returns to 0 when counter 6A1 is cleared.

Inverter 6A7 takes as its input signal the CLOCK signal via lead 581B, and it delivers its output signal to lead 6A7a. A 1 signal on lead 518b results in a 0 signal on lead 6A7a, and a 0 signal on lead 518b results in a 1 signal on lead 6A7a.

AND gate 6A8 takes as its input signals the inverted CLOCK signal on lead 6A7a (via inverter 6A7) and the output 8 signal from counter 6A1 via lead 6A1a. When both of its input signals are 1 AND gate 6A8 delivers a 1 output signal to lead 6A8a. (If either of its input signals are 0, AND gate 6A8 delivers a 0 output signal to lead 6A8a.)

NOR gate 6A3a takes input signals from leads 6A8a and 519a. When either of these input signals goes to 1, NOR gate 6A3 generates a logical 0 output signal on lead 6A3a, which then clears the output signals of counter 6A1 to 0.

Inverter 6A2 produces a 0 output signal on lead 6A2a when its input signal on lead 6A1d is 1. It produces a 1 output signal on lead 6A2a when its input signal on lead 6A1d is 0.

NOR gate 6A6 produces a 0 output on lead 6A6a when the signal on at least one of its input leads 6A1a, 6A1b, 6A1c, and 6A2a is 1.

The signal on lead 6A6a serves as the CNT input signal for counter 6A5. Counter 6A5 counts the transitions from logical 0 to logical 1 of this CNT input signal and produces a corresponding output signal on leads 518a. (Alternatively, counter 6A5 can count pulses exceeding some minimum pulse width rather than 0 to 1 transitions on lead 6A6 as is well known in the art. This will prevent the undesired counting of any glitches that may occur on lead 6A6 due to transient or transitional conditions on the input leads of NOR gate 6A6. A filter common in the art can be used on lead 6A6a for the same purpose. In the detailed circuit discussions which follow, many of the references to 0 to 1 transitional states used for triggering a particular action, can be replaced by these alternative modes if desired, as is well known in the art.)

Inverter 6A4 produces a 0 output signal on lead 6A4a when its input signal from lead 519a (framing pulses) is 1. It produces a 1 output signal on lead 6A4a when its input signal from lead 519a is 0. When the signal on lead 6A4a goes to 0, the output signals from counter 6A5 on leads 518a are cleared to 0.

OPERATION

Counter 6A1 is cleared during the first bit (framing bit) of each frame by a framing pulse. It then begins counting clock pulses and lead 6A1a receives a 1 signal when the count reaches eight. After the signal on lead 6A1a goes to 1, the signal on lead 6A8a will also go to 1 when the CLOCK signal goes to 0. This 1 signal on lead 6A8a is then used to clear the outputs of counter 6A1, causing the signals on leads 6A1a, 6A8a, and therefore 516b to return to 0. (The pulse width of the TSD8 signal on lead 516b is adjustable via selection of gates 6A3 and 6A8 and counter 6A1 for a total desired propagation delay as is known in the art.)

The signal on lead 6A6a is a 1 only during the first bit of each time slot in a frame. The first bit following the framing bit constitutes the first bit of time slot number one and counter 6A5 outputs a 1 to its least significant output bit on lead 6A5a to give TS# the value 1 during this first time slot of the frame.

Counter 6A5 continues to increment its TS# output signals at the beginning of each time slot (due to the 0 to 1 transition of the signal on lead 6A6a at the beginning of each time slot), and TS# reaches the value 24 (represented by a 1 signal on leads 6A5b and 6A5c with 0 signals on all of the remaining leads of group 518a) during the 24th time slot of the frame before it is cleared to 0 by the framing pulse which begins the next frame.

IDLE TIME SLOT SEARCH AND LOCK 516 DETAILED DESCRIPTION (FIG. 9)

FUNCTION

Circuit 516 (FIGS. 6 and 9) searches for an idle time slot. When it finds one, it outputs signals representing the number of the idle time slot to leads 516a at Port 10 for as long as the idle time slot satisfies the following idle criteria: An idle time slot is interpreted as a time slot which has contained the value 00000000 in its most recent 64 occurrences. (During time slots when no PIB 45-k [FIG. 4] is writing to the XMIT line 43a [FIG. 4], that line is idle and is pulled to ground for a logical 0 state at its Central Equipment interface 41. Thus the repeated value 00000000 is interpreted as idle.)

SPECIFICATIONS

Figure 9:
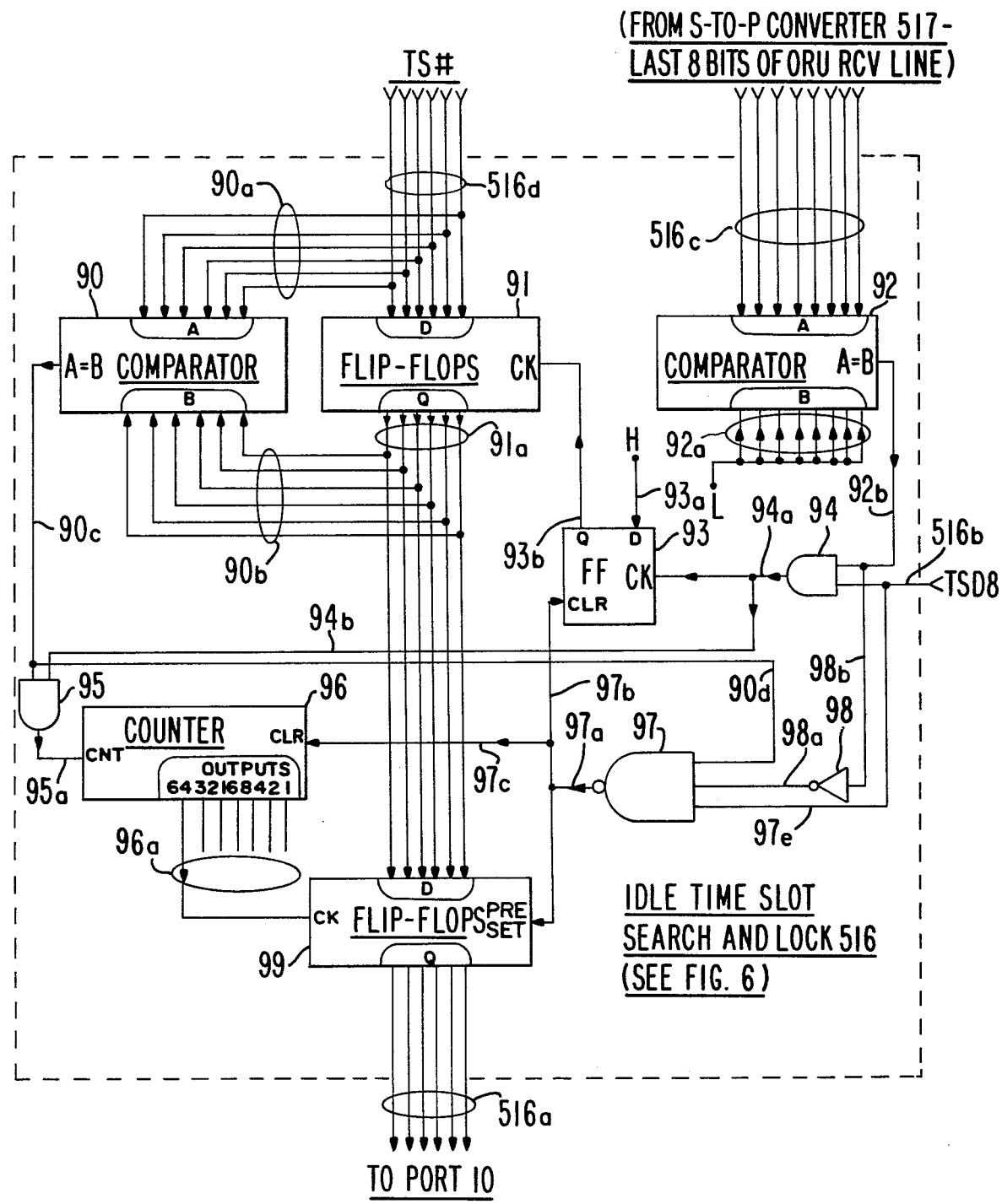
FIG. 9 shows the idle time slot search and lock circuitry.

Comparator 92 (of standard design) receives an eight bit A input signal on leads 516c from serial-to-parallel converter 517 (FIG. 6) and compares this signal with a 00000000 B input signal on leads 92a (shown as 1 to denote low logic level in the sketch). If the A input signal is 00000000 the signal on the A=B output lead 92b from comparator 92 will go to logical 1. The signal on lead 92b is input to AND gate 94 along with the TSD8 signal on lead 516b (FIGS. 6 and 9). If the signals on both input leads to AND gate 94 are 1, the output signal from gate 94 on lead 94a *will be* 1 indicating that a time slot contains 00000000.

The output signal on lead 94a of AND gate 94 clocks data flip-flop 93. The signal level on the data input lead 93a of flip-flop 93 is a 1 (shown as "H" in FIG. 9 to indicate high logic level). When the signal level on lead 94a to flip-flop 93 (the CK input) makes a 0 to 1 transition, the signal on the Q output lead 93b will be made 1. That is, if the signal on the Q output lead 93b was a 1 at the time of the 0 to 1 CK transition, it will remain 1. If the signal on the Q output lead 93b was 0 at the time of the 0 to 1 transition on the CK input lead 94a, the signal on the Q output lead 93b will undergo a 0 to 1 transition.

Flip-flops 91 take their CK (clock) input signal from lead 93b, the Q output lead of flip-flop 93. Flip-flops 91 take their D (data) inputs from the leads 516d containing the TS# signal. When the signal on the CK input lead 93b of flip-flops 91 undergoes a 0 to 1 transition, the D input signals on leads 516d (representing the time slot number from which the byte represented by the signals on leads 516c was derived), are latched to leads 91a as the Q output signals of flip-flops 91.

Comparator 90 compares the TS# signal on leads 90a with the Q output signals on leads 91a from flip-flops 91. If the TS# signal equals the Q output signals from flip-flops 91, the A=B output signal on lead 90c from comparator 90 becomes a 1. This means that the present TS# (representing the current time slot number of the signal on the RCV line 520b (FIG. 6) is the same as the TS# which was present for the last 0 to 1 transition of the Q output of flip-flop 93, caused by a 00000000 in said time slot at its last occurrence. If said time slot also now contains 00000000 a 1 output signal on lead 94a from AND gate 94 will result.

AND gate 95 takes its input signals from lead 90c carrying the A=B output signal from comparator 90 and from the output signal on lead 94a of AND gate 94. If both of its input signals are 1, AND gate 95 will output a 1 to the CNT input lead 95a of counter 96.

Counter 96 of standard design counts the 0 to 1 transitions of the signal on its CNT input lead 95a. If the time slot number indicated by the signal on the Q output leads 91a of flip-flops 91 has 64 consecutive occurrences of the value 00000000, the signal on output lead 64 of leads 96a from counter 96 will make a 0 to 1 transition, thereby clocking flip-flops 99 via their CK input lead. On said 0 to 1 transition of the signal on output lead 64 from counter 96, the signals on the D (data) input leads 91a of flip-flops 99 are transferred to the Q output leads 516a of flip-flops 99.

Inverter 98 takes the A=B output signal from comparator 92 as its input signal and produces an output signal which is the complement of its input (i.e. If the input signal to gate 98 is a logical 1, its output signal will be a 0 and vice versa.)

NAND gate 97 takes three input signals which are TSD8 on lead 97e, the output signal from inverter 98 on lead 98a, and the A=B output signal on lead 90d from comparator 90. If these three input signals are 1 at the same time, the output signal from NAND gate 97 goes to 0 and serves as a clear signal for counter 96 and flip-flop 93 (clearing their output signals to 0) and as a pre-set for flip-flops 99 (setting their output signals to 1). NAND gate 97 thus restarts the search for an idle time slot when the byte in a time slot previously thought to be idle is found to contain a value other than 00000000.

OPERATION (beginning from a state in which flip-flop 93 has been cleared and therefore has a Q output signal on lead 93b of logical 0).

When a time slot occurs containing the value 00000000 the output signal from AND gate 94 goes to 1, thereby clocking flip-flop 93 and resulting in the clocking of flip-flops 91. This latches the number represented by the signals on leads 516d denoting the present time slot to the Q output leads 91a of flip-flops 91. Each subsequent occurrence of this time slot is analyzed to see if it still contains the value 00000000. If the same time slot repeats this value in 64 consecutive frames, it is interpreted as an idle time slot, and its number is transmitted as an output signal on leads 516a from flip-flops 99 to Port 10 where it can be read by the PIB processor 530 (FIG. 5). However, when any value other than 00000000 is read in this time slot, counter 96 and flip-flop 93 are cleared to produce 0 level output signals and the signals on output leads 516a from flip-flops 99 are pre-set to the 1 level. The clearing of flip-flop 93 takes the system back again to the beginning condition of Operation, and the search for an available time slot containing 00000000 begins anew.

NAME SEARCH AND TIME SLOT LOCK CIRCUIT 515 (FIG. 10) DETAILED DESCRIPTION

FUNCTION

This circuit searches the bit stream on RCV line 520b (FIG. 6) as represented by output signals on leads 517a from shift register 517 for a time slot which alternates the byte contained on input leads 515a from Port 8 with the name verification byte (NVB) which is 00111111. When a time slot is found which maintains this alternating pattern for eight consecutive frames, its number is transmitted as output signals via leads 515b to Port 9.

Typically, a PIB 45-k (FIG. 4) will output its own NAME to Port 8. It will then poll Port 9 as a part of its normal routine, to see if any other PIB 45-i (where i is an integer other than k) is trying to call it.

SPECIFICATIONS

Comparator 101 compares the signals on input leads 517a (see FIGS. 6 and 10) (comprising at any instant the instantaneous input byte A from the serial-to-parallel converter 517 representing the last complete byte received on RCV line 520b by PAC circuit 510 (FIG. 6) with the signals on leads 515a comprising byte B from Port 8. If the two bytes match, the signal on the A=B output lead 101b of comparator 101 goes to 1.

AND gate 106-4 receives input signals comprising TSD8 on lead 515d (FIGS. 6 and 10) and the A=B output signal on lead 101a from comparator 101. If the signal levels on both input leads are 1, the output signal on lead 108m from AND gate 106-4 goes to 1 (indicating that a time slot has been found which contains the byte specified by Port 8). The transition of this output signal on lead 108m from 0 to 1 clocks flip-flop 108-1.

The signal on the Q output lead 108k from flip-flop 108-1 either changes from 0 to 1 or remains a 1, depending on whether it was a 0 or a 1 at the time the output signal on lead 108m from AND gate 106-4 made a 0 to 1 transition.

The signal on Q output lead 108k from flip-flop 108-1 clocks flip-flops 102. When the CK input signal on lead 108k to flip-flops 102 makes a 0 to 1 transition, the signal representing TS# on leads 515c is latched to the Q output leads 102a of flip-flops 102.

Comparator 103 continuously compares the signals on leads 103a representing the instantaneous TS# with the Q output signals on leads 102a from flip-flops 102. If they are the same, the signal on the A=B output lead 103b of comparator 103 goes to 1.

Figure 10:
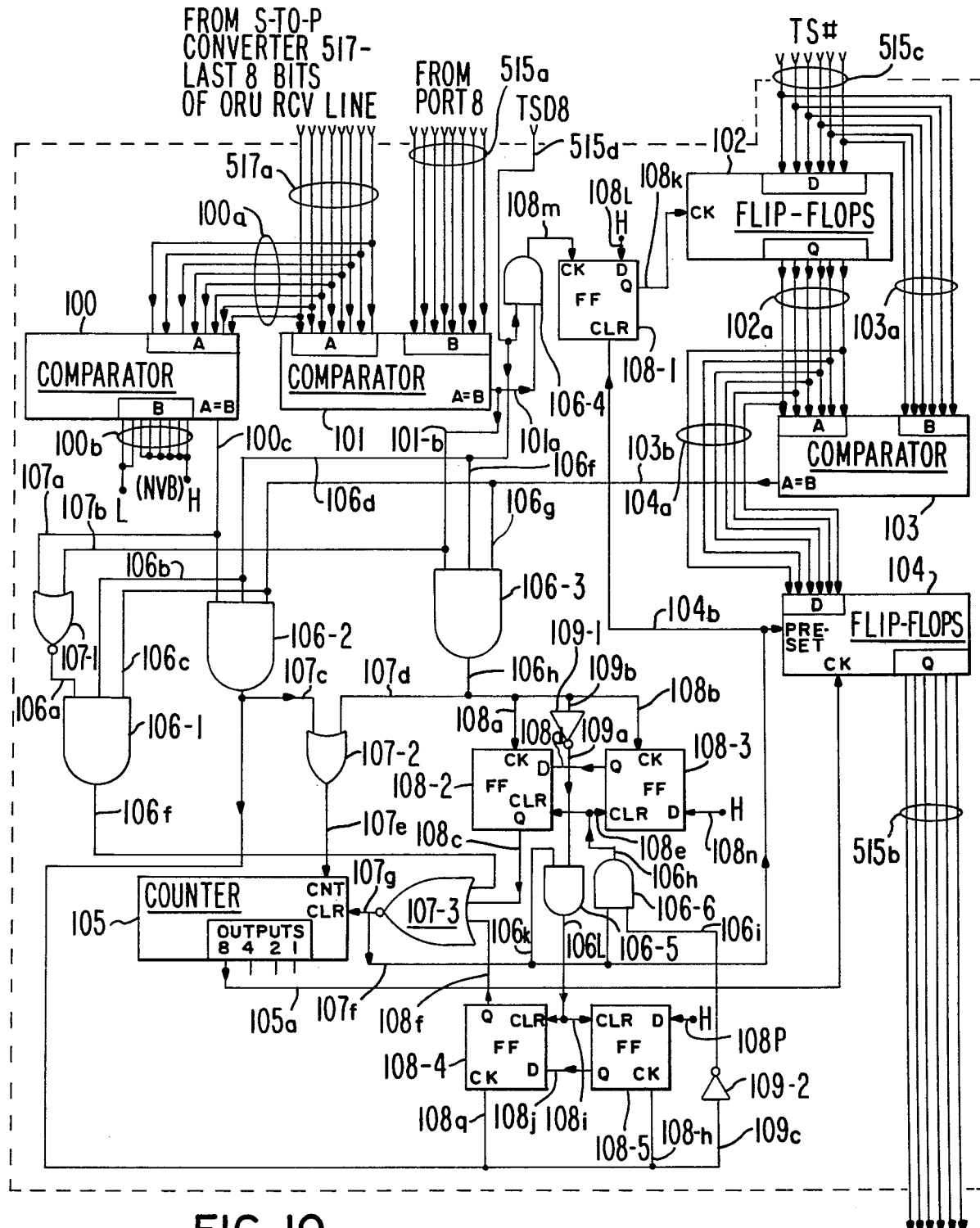
FIG. 10 shows the name search and time slot lock circuitry.

Comparator 100 compares the signals on input leads 100a representing input byte A from the serial-to-parallel converter 517 with the signals on leads 100b representing input byte B which is the name verification byte (NVB). The NVB is shown in FIG. 10 as LLHHHHHH where L represents a low logic state (0) and H represents a high logic state (1). If the two compared bytes match, the signal on lead 100c representing the A=B output of comparator 100 goes to a logical 1 state.

AND gate 106-2 takes as inputs the A=B signal on lead 100c from comparator 100, the signal on lead 103b representing A=B from comparator 103, and the TSD8 signal on lead 106d. The output signal from AND gate 106-2 goes to 1 when the NVB pattern is found in the byte identified by the time slot number (represented by the signals on the Q output leads 102a of flip-flops 102) where the byte from Port 8 was found in the immediately preceding frame.

AND gate 106-3 takes input signals on lead 101b (representing A=B from comparator 101), on lead 106g (representing A=B from comparator 103) and on lead 106f (representing TSD8). The output signal from AND gate 106-3 on lead 106h goes to 1 when the byte from Port 8 on leads 515a is found in the time slot number (represented by the signal on the Q output leads 102a of flip-flops 102) where this byte from Port 8 was previously found.

OR gate 107-2 takes its input signals from AND gates 106-2 and 106-3. OR gate 107-2 delivers a logical 1 output signal when either of its input signals are 1. This output signal clocks counter 105.

Counter 105 increments its count for each 0 to 1 transition of its CNT input signal on lead 107e. If the count reaches 8 in counter 105 before being cleared by a 0 signal on the CLR input, the output signal on lead 8 goes to 1 and clocks flip-flops 104.

Flip-flops 104 latch their D input signals on leads 104a (from flip-flops 102) to their Q output leads 515b on a 0 to 1 transition of the signal on the CK input lead 105a from output lead 8 from counter 105. These Q output signals are delivered to Port 9 on leads 515b and represent a time slot number containing the desired NAME.

NOR gate 107-1 takes input signals on lead 107a (representing A=B from comparator 100) and on lead 107b (representing A=B from comparator 101). If both of these input signals are 0, NOR gate 107-1 produces a logical 1 output signal. And gate 106-1 receives input signals on lead 106a from NOR gate 107-1, from lead 103b representing the A=B output signal from comparator 103, and from the TSD8 signal on lead 106b. The output signal for AND gate 106-1 on lead 106f will be 1 if neither the NVB pattern nor the NAME byte from Port 8 on leads 515a is found in the time slot represented by the time slot number (represented by the signals on Q output leads 102a from flip-flops 102) where the byte from Port 8 was previously found.

Flip-flop 108-3 latches the signal level on its D input lead 108n (which is a high logic level, i.e., a 1) to its Q output lead 108d when the output signal from AND gate 106-3 on lead 106h changes from a 0 to a 1.

Flip-flop 108-2 receives the signals on its D input lead 108-d from the Q output lead of flip-flop 108-3. Flip-flop 108-2 latches the signal on its D input lead 108-d to its Q output lead 108c when the output signal from AND gate 106-3 changes from a 0 to 1.

Flip-flop 108-5 receives a high level input signal corresponding to a logical 1 on input lead 108p, the D input to this flip-flop. This logical 1 is transferred to its Q output lead when the output signal from AND gate 106-2 changes from a 0 to a 1.

Flip-flop 108-4 receives the input signal on its D input lead 108j from the Q output lead from flip-flop 108-5. Flip-flop 108-4 latches the D input signal to its Q output lead 108f when the output signal from AND gate 106-2 changes from a 0 to a 1.

NOR gate 107-3 receives three input signals, one from AND gate 106-1 on output lead 106f, a second on lead 108c from the Q output lead of flip-flop 108-2, and the third on lead 108f from the Q output lead of flip-flop 108-4. NOR gate 107-3 produces a 0 output signal on output lead 107g when any of the signals on the three input leads 106f, 108c and 108f to this NOR gate are a 1. The output signal from NOR gate 107-3 serves as a master clear for the name search and time slot lock circuit 515. When the output signal from NOR gate 107-3 goes to a 0, it clears counter 105, flip-flops 108-2 and 108-3, flip-flops 108-4 and 108-5, and flip-flop 108-1 to produce output signals representing a "0." A 0 output signal from NOR gate 107-3 also presets the Q output signals from flip-flops 104 to logical 1's.

AND gate 106-5 receives output signals from NOR gate 107-3 and the inverted output signal from AND gate 106-3 (via inverter 109-1). AND gate 106-5 produces a zero output signal when the input signals on either of its input leads 106k or 109a are 0. A 0 output signal from AND gate 106-5 will clear the Q output signals from flip-flops 108-4 and 108-5 to logical 0's.

AND gate 106-6 takes input signals from NOR gate 107-3 on lead 107f and from the inverted output signal from AND gate 106-2 (via inverter 109-2). AND gate 106-6 produces a 0 output signal when either of its input signals are 0. A 0 output signal from AND gate 106-6 will clear the Q output signals from flip-flops 108-2 and 108-3 to logical 0.

OPERATION (beginning from a state in which flip-flop 108-1 has been cleared and therefore produces a logical 0 on its Q output lead 108k)

When a match is found by comparator 101 between the byte in some time slot and the byte in Port 8 represented by the signals on leads 515a, the number representing that time slot on leads 515c is latched by flip-flops 102 to leads 102a (the Q output leads from flip-flops 102). Subsequent bytes from this time slot which occur in series are analyzed one by one to see if they contain either the byte from Port 8 represented by the signals on leads 515a or the name verification byte (NVB). If they contain either of these bytes, counter 105 is incremented.

Eight incrementations of counter 105 without a clear causes the time slot number contained on leads 515c to flip-flops 102 to be latched to the Q output leads 515b of flip-flops 104 (corresponding to Port 9). This time slot number is then read by the PIB processor 35 via Port 9.

A failure in the alternation pattern (i.e. a failure of the NVB to alternate as required with the byte from Port 8 on leads 515a for the time slot under consideration) will cause the eight output leads 515b at Port 9 to change to the signal 11111111 and also cause the clearing of flip-flop 108-1 as a result of a signal transmitted on leads 104b and 107f from NOR gate 107-3. The search for an appropriate time slot will now begin again. Events ("failures") which cause a new search to begin are:
1. If the time slot numbered on leads 102a contains neither the NVB nor the byte on leads 515a from Port 8, then the output signal from AND gate 106-1 goes to 1 causing the master clear output signal from NOR gate 107-3 to go to 0.
2. Flip-flops 108-2 and 108-3 operate together to activate the master clear when two occurrences of the NAME byte on leads 515a (Port 8) are found in the time slot numbered on leads 102a without an intervening occurence of the NVB pattern.
3. Flip-flops 108-4 and 108-5 operate together to activate a master clear when two occurrences of the NVB pattern are found in the time slot numbered on leads 102a without an intervening occurrence of the NAME byte which is given on leads 515a (from Port 8).

DATA AND CODE READ (514) (FIG. 11) DETAILED DESCRIPTION

FUNCTION

Circuit 514 reads data and code information from selected time slots.

Figure 11:
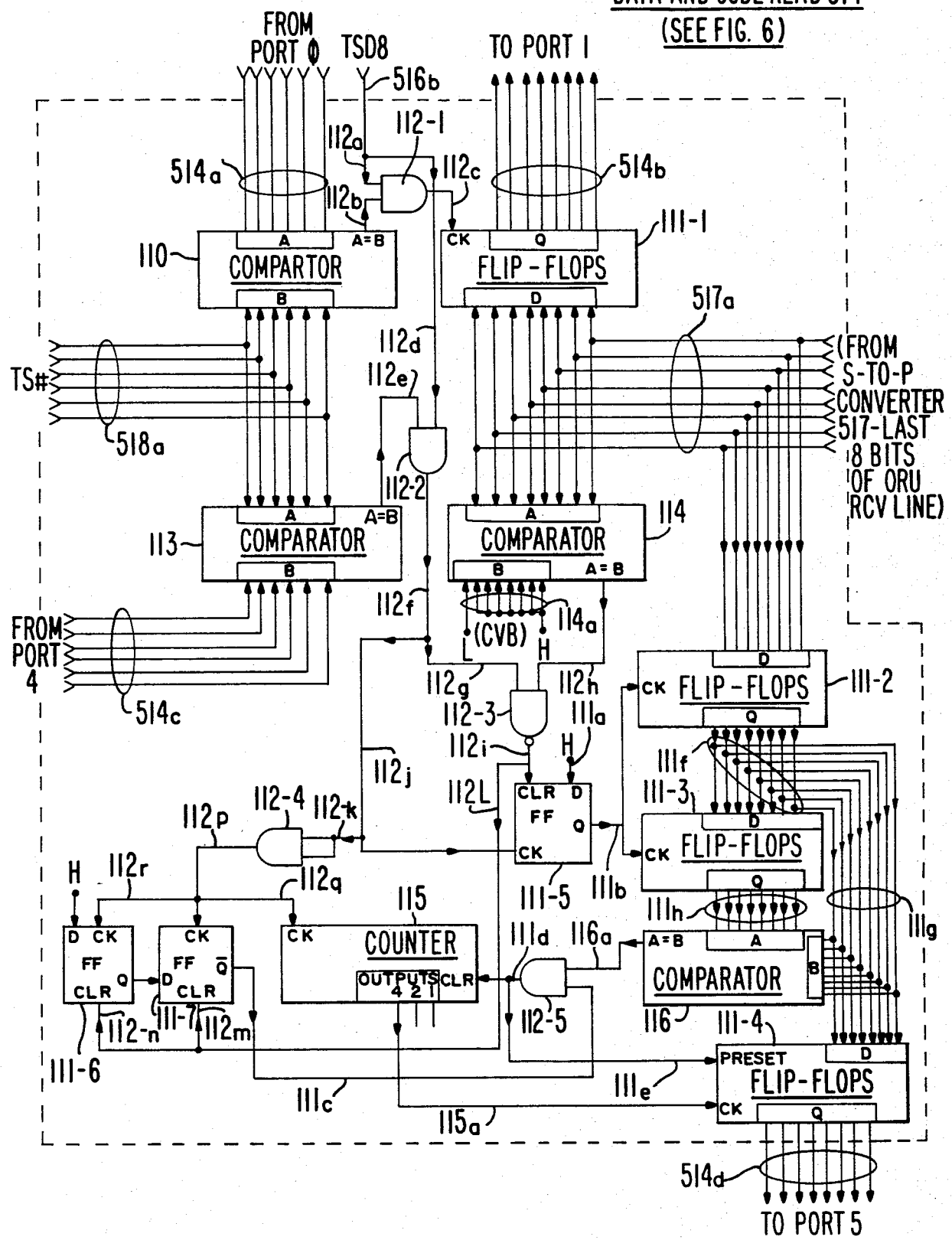
FIG. 11 shows the data and code read circuitry.

If data is to be read, the PIB 25 (FIG. 2) or 45-k (FIG. 4) specifies via signals on input leads 514a from Port 0 the number of the time slot to be read. Once each frame the byte contained by that time slot is transmitted by data and code read circuit 514 to leads 514b of Port 1 (FIGS. 6 and 11).

"Code" is defined as the alternation in a time slot of a byte of data with the code verification byte (CVB) which is 01111111. The data and code read circuit 514 searches for this alternating pattern in the time slot number specified by the signal on leads 514c from Port 4. If circuit 514 finds this alternating pattern—CVB, data byte . . . , CVB, same data byte, CVB, same data byte, CVB—in the specified time slot, this data byte is interpreted as Code and is transmitted to leads 514d at Port 5.

Typically Code, as defined above, is used by PIB processors 25 (FIG. 2) and 45-k (FIG. 4) for communicating from one processor to the other after an interprocessor link has been established via NAME call and NAME acknowledge. The principal reason for the difference in format between Code and NAME (i.e. the difference between the CVB and NVB patterns) is the prevention of some PIB processor from mistakenly interpreting the coded communications between two other PIB processors as a call to its NAME. Using the technique described here such a mistake is not possible because the formats for Code and NAME are totally different.

For high speed data transfers between PIBs, the signal on leads 514b at Port 1 enables a PIB to receive 64,000 bits per second from any other PIB. If the PIB is incorporated into a telephone, this 64,000 bits per second steam interferes to a standard PCM codec for conversion of the digital bit stream to analog voice signals.

SPECIFICATIONS

Turning to FIG. 11, comparator 110 compares the input signals on leads 514a from port 0 ("A" input) representing a particular time slot to the input signals on leads 518a (the "B" input) representing the instantaneous time slot of the signal on RCV line connection 520b. If the time slot number specified by the signals on leads 514a at Port 0 equals the present time slot number (TS#) transmitted on leads 518a, then the output signal on lead 112b from comparator 110 representing the "A=B" condition at comparator 110 goes to a logical 1.

AND gate 112-1 receives an input signal from comparator 110 on lead 112b and also receives the TSD8 input signal on lead 516b through lead 112a. If both of these input signals are a logical 1, the output signal from AND gate 112-1 will also be a logical 1.

Flip-flops 111-1 are clocked by the output signal from AND gate 112-1. Flip-flops 111-1 latch the input signals on their "D" input leads (corresponding to the information byte in the time slot identified by the TS# on leads 518a) from the serial to parallel converter 517 (FIG. 6) transmitted on leads 517a to "Q" output leads 514b when the output of AND gate 112-1 changes from a logical 0 to a logical 1.

Comparator 113 compares the input signals representing the TS# on leads 518a to the input signals on leads 514c from Port 4. If these two input signals are identical, the output signal on lead 112e goes to a logical 1 representing the equality of the A and B input signals to comparator 113.

AND gate 112-2 receives input signals from comparator 113 on lead 112e and the TSD8 signal on lead 516b and 112d. If the signals on both of these input leads are a logical 1, the output signal from AND gate 112-2 will also be a logical 1.

Comparator 114 compares the input signals on leads 517a (the "A" input signals) with the Code verification byte corresponding to the "B" input signals on leads 114a. The Code verification byte (CVB) is 01111111. If these two bytes are the same, the signal on the A=B ouput lead 112h from comparator 114 goes to a logical 1.

NAND gate 112-3 receives input signals on input leads 112g and 112h from AND gate 112-2 and comparator 114, respectively. If both of these input signals are a logical 1, the output signal on lead 112i from NAND gate 112-3 will be a logical 0 and will indicate that the current byte in the time slot specified by Port 4 (leads 514c) is the Code verification byte (CVB). The logical 0 output signal from NAND gate 112-3 on lead 112i clears the "Q" output signals from flip-flops 111-5, 111-6 and 111-7 to produce logical 0's.

Flip-flop 111-5 is clocked by a transition from logical 0 to a logical 1 of the output signal on the output lead 112f from AND gate 112-2. The D input lead 111a to flip-flop 111-5 is a logical 1 (i.e. a high logic level shown as "H" in FIG. 11). A transition from a low logic level 0 to a high logic level 1 by the signal on the CK input lead 112j of flip-flop 111-5 indicating an occurrence of the time slot specified by the signal on leads 514c at Port 4 causes the output signal on the Q output lead 111b of flip-flop 115-5 to go to a logical 1. If this ouput signal had previously been cleared to a logical 0 by the output signal on lead 112i from NAND gate 112-3 (due to the presence of the CVB pattern in the specified time slot), the output signal on the Q output lead 111b from flip-flop 111-5 changes from a logical 0 to a logical 1. This change causes the input signals on the D input leads 111f to flip-flops 111-3 (from the Q output leads of flip-flops 111-2) to be latched to the Q output leads 111h of flip-flops 111-3. The change from a logical 0 to a logical 1 of the output signal on the Q output lead 111b of flip-flop 111-5 also causes the input signals on the D input leads 517a of flip-flops 111-2 (from serial to parallel converter 517) to be latched to the Q output leads 111f of flip-flops 111-2. These signals represent the last complete byte received on RCV line connection 520b (FIG. 6).

Comparator 116 compares the byte specified by the signal on the Q output leads 111f from flip-flops 111-2 with the byte specified by the signal on the Q output leads 111h from flip-flops 111-3. If these two bytes are the same, the signal on the A=B output lead 116a is set to a logical 1.

AND gate 112-4 receives the signals on its two input leads from AND gate 112-2 by means of leads 112f, 112j and 112k. The output signal from AND gate 112-4 on lead 112p is identical to its input signal except for the propagation delay between its input lead and its output lead. A transition in the signal level from 0 to 1 on the output lead of gate 112-4 clocks flip-flops 111-6 and 111-7 and counter 115. The propagation delay for AND gate 112-4 is greater than for NAND gate 112-3 so that if flip-flops 111-6 and 111-7 are to be both clocked and cleared in the time of one bit position the clearing action (a logical 0 signal on the output lead 112*i* of NAND gate 112-3) will occur before and override the clocking action represented by a transition from a logical 0 to a logical 1 of the signal on the output lead 112*p* of AND gate 112-4. This transition will occur while the CLR input signals to flip-flops 111-6 and 111-7 are logical 0's.

If flip-flops 111-6 and 111-7 are clocked twice (due to two occurrences of the desired time slot) without being cleared by the presence of the CVB pattern in one of those time slot occurrences, the signal on the $\overline{Q}$ output lead 111*c* from flip-flop 111-7 goes to a logical 0.

Counter 115 counts the transitions from logical 0 to logical 1 of the signal on its CK input lead 112*g*. If the number of these transitions reaches four before counter 115 is cleared by the arrival of a logical 0 at its CLR input lead 111*d*, the output signal on output lead 115*a* from counter 115 changes from a logical 0 to a logical 1.

Flip-flops 111-4 latch the input signals on their D input leads 111*g* to the Q output leads 514*d* when the signal on output lead 115*a* from counter 115 changes from 0 to 1. The signals on the Q output leads from flip-flops 111-4 represent a byte of Code which is provided to the PIB processor 25 or 45 via Port 5 on leads 514*d*.

AND gate 112-5 receives its input signals from the $\overline{Q}$ output lead 111*c* from flip-flop 111-7 and from the A=B output lead 116*a* from comparator 116. If either of the signals on these input leads to AND gate 112-5 are logical 0's, the output signal from AND gate 112-5 goes to a logical 0, thereby clearing the signal on the output lead 115*a* from counter 115 to a logical 0 and presetting the Q output leads from flip-flops 111-4 to 11111111 thereby indicating to the PIB processor 25 or 45-k via Port 5 that no Code is present.

OPERATION

Data Read

The contents of the RCV line 520*b* (FIG. 6) time slot number specified by the signals on leads 514*a* at port 0 (FIGS. 6 and 11) are transmitted on output leads 514*b* from flip-flops 111-1 (FIG. 11) to port 1 at the end of each occurrence of said time slot (i.e., once each frame).

Code Read

The RCV time slot specified by the signals (representing the time slot number) appearing on the leads 514*c* from port 4 to comparator 113 is searched by comparator 114 for an appearance of the CVB pattern 01111111. When this pattern is found, at the next occurrence of the same time slot the byte of data as represented by the signals on leads 517*a* from the serial to parallel converter 517 (FIG. 6) is transferred to the Q outputs of flip-flops 111-2. Following this, the specified time slot must, in five consecutive frames beginning with an occurrence of the CVB pattern, contain the alternation "CVB, same data byte, CVB, same data byte, CVB . . . " in order for the data byte to be interpreted as Code and transferred by counter 115 to the output leads 514*d* from flip-flops 111-4 to port 5.

Flip-flops 111-6 and 111-7 will clear counter 115 every time the CVB pattern is not in the given time slot number in either of two consecutive frames.

Counter 115 will also be cleared by the output signal on the "A=B" output lead 116*a* from comparator 116 when the given time slot in any frame contains the CVB pattern and is then followed in the next frame by the occurrence of any byte other than the byte which followed the second to last appearance of the CVB pattern in the given time slot.

DATA, CODE, AND NAME WRITE 513(FIG. 12 DETAILED DESCRIPTION)

FUNCTION

Circuit 513 writes data, Code and NAME bytes (as defined above) specified by the PIB-25 microcomputer 530 (FIG. 5) via the output ports 3 and 7 of circuit 512 of FIG. 6, or data bytes specified directly by the user via leads 522*c* of FIG. 6. These bytes are written into time slots specified by the PIB processor 25 via the output ports 2 and 6 of circuit 512 of FIG. 6.

SPECIFICATIONS

Comparator 120 compares the input signals on leads 513*a* (FIGS. 6 and 12) received at input A representing a time slot number specification (see leads 513*a* of port 2 (FIG. 6)) with the signals on leads 518*a* (FIGS. 6 and 12) representing the current time slot number in the current frame. Note that FIG. 6 shows a conventional eight-bit port for port 2. However, the two most significant bits on the leads comprising port 2 are not used in this sytem at this time because the six less significant bits can specify all the time slots to be used in the system as presently contemplated. However, the two extra bits allow expansion of the capacity of the system without redesign. If the current time slot number represented by the signals on leads 518*a* equals the time slot number specified by the signals on the leads 513*a* of port 2, the output signal on the A=B output lead 120*a* from comparator 120 becomes a logical 1.

Parallel-to-serial shift register (i.e., converter) 123 receives eight input signals in parallel on the eight parallel input leads 513*b* from data selector 522 which selects data from the user via leads 522*c* or data via leads 522*a* from port 3. These signals specify a byte of data to be written into the time slot specified by the signal on leads 513*a* in port 2 (FIG. 6). Converter shift register 123 is clocked by a change in the CLOCK signal on leads 121*f* and 520*d* from a 0 to a 1. This CLOCK signal is derived by the PIB line interface 520 (FIG. 6) from the signals on the RCV line 520*b* (FIG. 6) and is transmitted on lead 520*d* to shift register 123 and shift register 122.

When the signal on the S/$\overline{L}$ (shift-load) input lead 120*a* to shift register 123 (from the A=B output lead 120*a* from comparator 120) is 0, the signal on the CK input lead 121*f* to shift register 123 is overridden and the eight parallel bits on leads 513*b* are loaded into shift register 123 with the parallel input "H" (indicating the eighth parallel input) appearing at the "serial output" lead 123*a*.

Once the signal on the "S/$\overline{L}$" input leads 120*a* to shift register 123 goes to a logical 1, further changes in the input signals on the parallel input leads 513*b* have no effect on the serial output signal taken from converter 123 on lead 123*a*. While the signal on the "S/$\overline{L}$" input lead remains 1 (during the existence of the time slot specified by the signal on leads 513*a* at port 2), each 0 to 1 transition of the CLOCK signal on lead 121*f* derived from lead 520*d* will produce a one-step shift in the serial output of shift registor 123, thereby serially shifting out from register 123 to ORU XMIT lead 127*c* the eight input signals received in parallel in the time slot specified by port 12.

The "Y" output signal from tristate buffer 127-2 follows the signal on its "A" input lead (from the "serial output" lead 123a from shift register 123) if the signal on the "C" (enable) input lead to buffer 127-2 derived from lead 120a from the "A=B" output lead of comparator 120" is a logical 1. If the "C" input lead of buffer 127-2 is 0, the signal on the output lead 127b from buffer 127-2 goes to a high impedance state.

Flip-flop 125 is clocked by the input signal on lead 125a (representing framing pulses) going from a logical 0 to a logical 1. One such 0 to 1 transition occurs every 193 bits at the beginning of each frame. The $\overline{Q}$ output signal from flip-flop 125 on lead 125c is transmitted on lead 125b to the D input of flip-flop 125, causing the output signals on the Q and OV/Q/ output leads of flip-flop 125 to toggle each time flip-flop 125 is clocked by the signal on lead 125a. For example, if the Q output signal is 1 the $\overline{Q}$ output signal will be 0, and when the CK input signal on lead 125a changes from 0 to 1, the Q output signal goes to 0 and the $\overline{Q}$ output signal goes to 1. The next time flip-flop 125 is clocked, the output signals reverse again. This pattern is repeated with new framing bits.

The $\overline{Q}$ output signal from flip-flop 125 is the C input signal on lead 125d to tristate buffers 124-9 through 124-16. When the output signal on the $\overline{Q}$ output lead 125c from flip-flop 125 is 0, tristate buffers 124-9 to 124-16 produce high impedance output states. When the output signal on the $\overline{Q}$ output lead 125d from flip-flop 125 is 1, the "Y" output lead signals from tristate buffers 124-9 to 124-16 follow the input signals on their A input leads derived from leads 513d of port 7.

Figure 12:
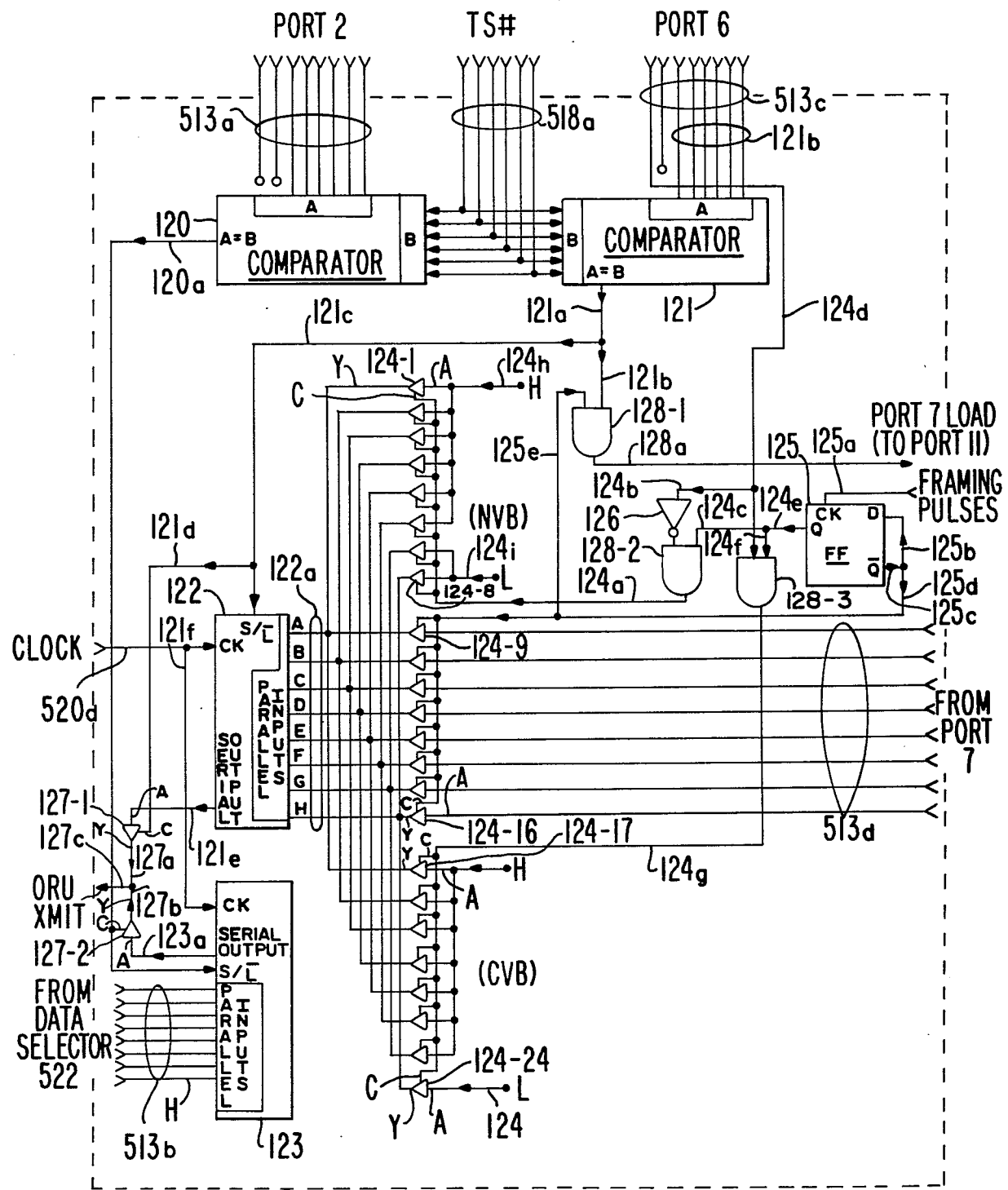
FIG. 12 shows the data, code and name write circuitry.

AND gate 128-3 receives input signals from the Q output lead 124e of flip-flop 125 and from the most significant bit (MSB) of port 6 transmitted on lead 124d. The MSB from port 6 is made a logical 1 by the PIB processor 530 (FIGS. 5 and 6) if it is desired to transmit Code to the ORU XMIT line 520c (FIG. 6), 127c (FIG. 12). The MSB of port 6 is made a logical 0 by the PIB processor 530 if it is desired to write a NAME to the ORU XMIT line 127c. If both of these input signals to AND gate 128-3 are 1 the output signal from AND gate 128-3 on lead 124g will be a logical 1.

The output signal from AND gate 128-3 is the C (enable) input signal to tristate buffers 124-17 through 124-24. When the output signal on lead 124g from AND gate 128-3 is 0, tristate buffers 124-17 through 124-24 have high impedance outputs. When the output signal from AND gate 128-3 is a logical 1, the Y output signals from tristate buffers 124-17 through 124-24 follow their A input. The A input signals to tristate buffers 124-17 through 124-24 consist of the code verification byte (CVB) pattern 01111111.

Inverter 126 takes the MSB of port 6 on lead 124d and produces as an output signal its complement (i.e., if the MSB is 0, inverter 6 produces a logical 1 output signal and vice versa).

AND gate 128-2 takes input signals from inverter 126 and from the Q output lead 124e from flip-flop 125. If both of these input signals are 1, the output signal from and gate 128-2 will be a logical 1.

The output signal from AND gate 128-2 is the input signal on the C input leads to tristate buffers 124-1 through 124-8. When the output signal from AND gate 128-2 on output lead 124a is 0, tristate buffers 124-1 through 124-8 have high impedance outputs. When the output signal from AND gate 128-2 is 1, the Y output signals from tristate buffers 124-1 through 124-8 follow the input signal on their A input leads 124h and 124i. The input signals on the A input leads to tristate buffers 124-1 through 124-8 consist of the NAME verification byte (NVB) pattern 00111111.

Tristate buffers 124-1 through 124-24 all provide input signals to the parallel input leads of parallel to serial shift registor 122. No conflict results in the simultaneous connection of these three sets of eight buffers to the eight parallel leads to shift register 122 since only one of the three sets (124-1 to 124-8, 124-9 to 124-16, and 124-17 to 124-24) is enabled via a logical 1 at its C input lead, at any given time. Buffers 124-9 to 124-16 are enabled every second frame (i.e., they are enabled in one frame, disabled the next frame, enabled the following frame, etc.). If the MSB of the digital signals on leads 513c in port 6 is 1 (i.e., the signal on lead 124d is 1), then buffers 124-17 to 124-24 are enabled in alternate frames with buffers 124-9 to 124-16. That is, buffers 124-9 to 124-16 are enabled in one frame and buffers 124-17 to 124-24 are enabled in the next frame. If the MSB of the signals at port 6 is 0, then the buffers 124-1 to 124-8 are enabled in alternate frames with buffers 124-9 to 124-16.

Comparator 121 compares the input signals on input leads 121b from port 6 comprising the A input signals to comparator 121 and representing a time slot specification in the least significant six bits of port 6, with the input signals on leads 518a representing the current time slot number as discussed above and comprising the B input signals to comparator 121. If the current time slot number represented by the signals on leads 518a equals the time slot number specification represented by the signals from port 6 on leads 121b, the A=B output signal on output lead 121A from comparator 121 will be a logical 1.

Parallel-to-serial shift register 122 is clocked by the CLOCK signal on lead 520d changing from a 0 to a 1. When the input signal on the S/L input lead to shift register 122 (derived from the signal on lead 121c from the A=B output lead 121a from comparator 121) is a logical 0, the CK input signal on input lead 520d is overridden and the input signals on the eight parallel input leads 122a are loaded into shift register 122, with parallel input signal H appearing at the serial output pin corresponding to lead 121e. When the input signal on the S/L input lead 121c to shift register 122 goes to 1, further changes in the input signals on the parallel input leads 122a have no effect on the serial output signals from shift register 122 on lead 121e. So long as the input signal on the S/L input lead 121c remains a logical 1 (i.e., during the time slot specified by port 6), each transition of the CLOCK signal on lead 520d from 0 to 1 will produce a one-step shift in the serial output signal on lead 121e from shift register 122, thereby serially shifting out the eight parallel input signals derived from leads 122a in the eight bits of the time slot specified by the input signals on leads 121b from port 6.

Th Y output signal from tristate buffer 127-1 on lead 127a and on ORU XMIT lead 127c follows its A input signal (from the serial output lead 121e of comparator 122) if the C input signal to buffer 127-1 from the A=B output signal on leads 121a, 121c and 121d from comparator 121 is 1. If this input signal on the C input lead 121d is 0, the output signal from buffer 127-1 on lead 127a goes to a high impedance state.

AND gate 128-1 receives input signals on leads 121b and 125e from the A=B output lead 121a of comparator 121 and the $\overline{Q}$ output signal on leads 125e, 125d and 125c from flip-flop 125. If both of these input signals are a logical 1, the output signal on output lead 128a from AND gate 128-1 will be a logical 1. The output signal from AND gate 128-1 on lead 128a constitutes a signal called "Port 7 Load" which is transmitted to port 11 (FIGS. 6 and 12).

The "Port 7 Load" signal (FIG. 8e) consists of a pulse beginning with a 0 to 1 transition each time the byte in port 7 is latched into shift register 122 to be serially shifted out (i.e., every second frame at the beginning of the time slot specified by the signals on leads 121b in port 6). The falling edge of this pulse (i.e., a 1 to 0 transition) occurs at the end of said time slot. The "Port 7 Load" signal tells the PIB processor 530 that the byte it has placed in port 7 has been loaded and latched and is being transmitted on the XMIT line 520a (FIG. 6).

OPERATION

Data Write

The data byte contained by the signals on leads 513b from data selector 522 is loaded into shift register 123 at the beginning of the time slot specified by the signals on leads 513a from port 2 (FIG. 6). This byte is shifted out of register 123 serially one bit at a time over the eight bits of the time slot specified by the signals on leads 513a. This serial bit stream is transmitted out on lead 123a and on line ORU XMIT 127c. A 64,000-bit-per-second data stream can be transmitted over the specified time slot by inputting signals representing one data byte on leads 513b each frame via data selector 522. For vioice applications, the signals on input leads 513b can be provided by a standard PCM codec via leads 522c (FIG. 6) leads 513b via data selector 522.

Code Write

If the most significant bit (MSB) of port 6 is a logical 1, the data byte contained in port 7 on leads 513d will be transmitted in the time slot specified by the signals on leads 121b from port 6 in a sequence (satisfying the previously defined requirement for Code) consisting of "CVB, data byte, CVB, same data byte, CVB . . . ".

Name Write

If the MSB in port 6 on lead 124d is 0, the data byte contained in port 7 will be transmitted on ORU XMIT lead 127c in the time slot specified by the signals on leads 121b from port 6 in the previously defined sequence for NAME, consisting of " . . . NVB, data byte, NVB, same data byte, NVB . . . ".

PAC LINE CENTRAL EQUIPMENT INTERFACE CIRCUIT 410 (FIG. 13)

FUNCTION

Circuit 410 serves as an embodiment of the central equipment interface for a Distributed Switching Network (DSN) Parallel Access Communications Line (PAC Line).

For stand-alone operation of a single DSN PAC Line group (consisting of up to 127 PIB's), this circuit doubles the XMIT (talk) line 23a back to the RCV (listen) line 23b and matches the timing of the two. This allows all PIB's 25 or 45-k (FIG. 2 or 4) of the PAC Line group to communicate with each other by talking over the XMIT line 23a and listening to the RCV line 23b.

For DSN connection to other networks or equipment, trunks in standard analog or digital format can connect these other systems into the DSN central equipment interface using well-known design techniques.

For a system wherein multiple PAC Line Groups of up to 127 PIB's each are interconnected, circuit 410 enables the PAC Line which it serves to interface to a space division matrix (SDM) switching stage either directly or remotely. The SDM and remoting options are discussed in a later section.

SPECIFICATIONS (See FIGS. 13 and 14a-14h)

Resistor 130c pulls the XMIT line 23a to a logic state of 0 (shown as ground in FIG. 13) for time slots in which the XMIT line 23a is idle. In the embodiment under discussion, the XMIT half of the PAC Line is idle for time slots when none of the PIB's 25 or 45-k (FIG. 2 or 4) connecting to it are transmitting. An idle time slot on XMIT line 23a will thus be read as 00000000 at this PAC Line central equipment interface circuit 410.

Figure 6A:
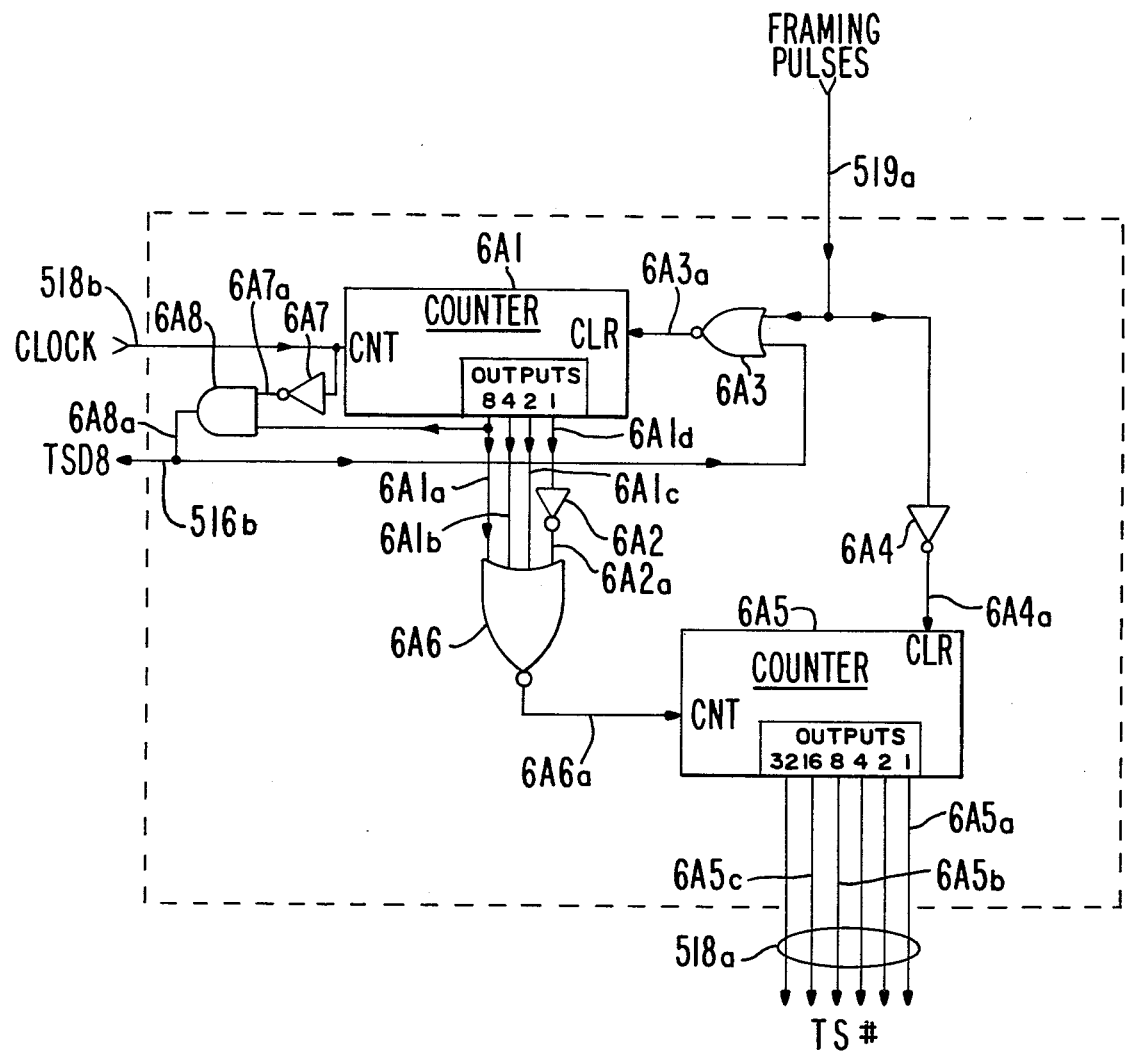
FIG. 6a shows the time slot definition and counter circuit.

Delay 130 adds delay to the input signal on the RCV line 23b. Referring to FIG. 4, the added delay is equivalent to the round trip delay of a PIB tab-off such as 46a, 46b connecting a PIB such as PIB 45-k to the PAC line 43a, 43b. This delay, when significant, is made constant for all PIB's 45 of a PAC Line group. It consists of the delay sum of 1. The delay from the RCV bus 43b to the PIB (such as PIB 45-k, FIG. 4) over its RCV 43b connection 46b,
2. The delay from the PIB 45-k to the XMIT bus 43a (FIG. 4) over a PIB's XMIT connection 46a, and
3. The internal PIB delay between the RCV line interface and the XMIT line interface (consisting primarily of the internal delay of the Time Slot Definition and Counter circuit 518 (FIG. 6A) and the comparator, shift registor and ORU XMIT tristate buffer delays in FIG. 12). This can be minimized as desired by methods well known in the art, such as using high speed gate structures common in the semiconductor arts.

Delay 130 can be omitted in many applications in which the delay sum above is insignificant when compared with the 324 nonosecond width of a T1 pulse. However, it is required if PIB PAC Line connections are long or the internal PIB delay is long due to use of components having long propagation delays. Delay 130 delays the signal on the RCV line 43b, and 23b so that its time slots match up with the time slots of the signal on the XMIT line 43a and 23a. The delay of delay 130 can be provided by using standard industry techniques. In many cases where the required delay is significant for the functioning of the system, a rough approximation of the delay of one PIB connecting loop will be sufficient. The desired delay can be obtained by using a length of wire (using a figure of one nanosecond delay per foot of wire as a rule of thumb), a solid-state delay structure, or other known means.

Ideally, the delay sum mentioned above should be the same for all PIB's connecting to a given PAC line. Referring to FIG. 4, to avoid the need for PAC line tap-off 46a, 46b to be the same length for all PIB's 45 connecting to a given PAC line 43a, 43b, an optional normalizing delay can be included in line interface 520 (FIG. 5) or at the interface where tap-off 46a, 46b connects to PAC line 43a, 43b. This normalizing delay can consist of a length of wire (which can be laid out on a spool in equal numbers of clockwise and counter-clockwise windings) with a number of tap-off points along its length to which line 46a can be connected to add selected delay. Delay can be added in this way to line 46a or 46b or both to simulate the delay of a longer line. Using this method, a simulated line length of say 100 feet can be chosen for the length of all PAC line tap-offs 46a, 46b for a given PAC line. The actual length of any particular tap-off 46a, 46b for a particular PIB 45k will then be less than 100 feet, with the necessary delay added at the time of installation via the above means to simulate 100 feet. In some embodiments, delay will be added in this way to both lines 46a and 46b. In other embodiments, a desired roundtrip total tap-off delay can be achieved by just adding delay to either lines 46a or 46b. Other methods known in the art can, of course, be employed to provide the normalizing delay discussed here, if desired. The above techniques can also be used for adjusting for a variance in the interanal PIB delay (discussed in (3) above) from one PIB to the next. In this case a particular reference delay is selected which is somewhat greater than the delay to be found in any PIB. Then during factory test, the internal delay for each PIB can be measured and a normalizing delay added at a selected point in the PIB delay path of (3) above so that the total internal PIB delay in this path is the selected reference value. Such a procedure allows a wide tolerance in the delay of components used in PIB delay path (3) since this delay for each PIB can be normalized during factory test.

Line interface 131-2 is a standard circuit in the industry. Interface 131-2 receives its delayed RCV line input signal on lead 130a and provides two output signals. The first of these output signals is a clock (CLK) signal produced on lead 131b regenerated from the signal on the RCV line 43b by methods common in the art. The second output signal from line interface 131-2 is what will be referred to as a one-rail-unipolar (ORU) RCV signal. The ORU RCV signal is a unipolar (i.e., of one polarity only) as opposed to bipolar signal. A pulse on the incoming RCV line 43b of either positive or negative polarity in any bit position is transmitted from line interface 131-2 as a 1 on the ORU RCV output line and a nonpulse for any bit position on the incoming line 43b produces an output signal from line interface 131-2 as a 0 on the ORU RCV output lead 131a.

Line interface 131-1 receives its input signals from the XMIT line 43a and from the regenerated CLK output signal on line 131c from line interface 131-2. Line interface 131-1 does not have to regenerate its own CLK since the timing of the RCV and XMIT lines 43b and 43a, respectively, are matched. Line interface 131-1 produces on output lead 131e the ORU XMIT signal, derived from its XMIT line input lead 43a in the same manner as described for line interface 131-2 above.

In the preferred embodiment detailed here the PAC line central equipment interface recovers clocking pulses from the signals on the incoming RCV line and applies this recovered clock to the determination of the presence of pulses on the XMIT line as well as the RCV line. This is an important feature because if all of the transmitting terminals are idle, no signal will be coming in on the XMIT line and thus the PAC central equipment line interface will be unable to derive a clocking signal if it tries to do so from the XMIT line. Delay 130 (FIG. 13) is added to ensure that the rising edge of the clocking pulse generated by the clock regeneration circuit portion of line interface 131-2 is generated approximately in the middle of the first half of each pulse period on the XMIT line as well as for RCV line pulses (i.e., XMIT line pulses and delayed RCV line pulses are aligned). The first half of each pulse period is the active half, i.e., the half that is examined to check for the presence or absence of a pulse, as is well understood in the art of T1 PCM systems. It is desired to have the clocking signal occur in the middle of this acitve period. Therefore the clocking signal should occur approximately in the middle of the first half of the pulse period or at about ¼ of the time through each pulse period. Pulse period as described here refers to both the active first half of the period, where it is desired to determine the presence or absence of a pulse, and the passive second half of the period which is always a non-pulse in T1.

Master clock 136-1 is a standard crystal oscillator generating a 1.544 megabit per second clock output signal transmitted on leads 131f and 136d to the various components of the system.

Pulse synchronizer 131-3 receives as input signals the ORU XMIT, ORU RCV, CLK and master clock signals on leads 131e, 131a, 131d and 131h, respectively. Synchronizer 131-3 uses standard techniques to add additional delay (less than 648 nanoseconds, the period of one bit) to the CLK input signal on lead 131d so that the CLK input is synchronized with the master clock input signal on lead 131h. This same delay is added to the signals on the ORU XMIT and ORU RCV lines 131e and 131a, respectively, so that the leading edges of their pulses are also delayed to match the leading edges of the pulses of the master clock 136-1.

Following the synchronization of the leading edges of the pulses from the CLK signal on lead 131d with the leading edges of the pulses from master clock 136-1, a small additional delay is added to the CLOCK signal transmitted from synchronizer 131-3 on lead 131j by means of gate 137-8 so that the leading edge of the clock pulses on lead 131m lags behind the signals on the ORUS RCV line 131k and the ORUS XMIT line 131i a small amount so that the clock signal on lead 131m can effectively clock serial to parallel shift registers 132-1 and 132-2.

The timing problems prevented by use of pulse synchronizer 131-3 are subtle. The system will function in most cases without synchronizer 131-3. When problems do occur, they can be corrected by shortening or lengthening the PAC Line 43a, 43b. Synchronizer 131-3 removes the need for such corrections. Synchronizer 131-3 transmits the synchronized ORU XMIT, ORU RCV and CLK signals labeled ORUS XMIT, ORUS RCV, and CLOCK on leads 131i, 131k and 131j, respectively.

Leads 131i and 131k which carry signals out of synchronizer 131-3 or leads 131e and 131a which carry signals into synchronizer 131-3 are convenient points for gating in signals from trunks conncecting the DSN to other equipment. Master clock 136-1 and line group central processor 136-4 can be used in such trunk interfacing if desired, using techniques common in the art. Leads 136a and 136b also provide convenient points for gating in trunk signals, and can be used in some application embodiments.

Serial to parallel shift register 132-2 receives the ORUS RCV output signal from synchronizer 131-3 on lead 131k as the serial input signal to the shift register. Shift register 132-2 is clocked by the changes of the clock signal on lead 131m from 0 to 1. This clock signal lags the ORUS RCV signal on lead 131k a small amount as discussed above, thereby providing sufficient setup time for the ORUS RCV serial input signal on lead 131k to register 132-2 prior to clocking the register. Register 132-2 contains 193 bits, the length of a T1 frame. Register 132-2 in effect delays the ORUS RCV input signal by 193 bits, and the last eight bits (i.e., the eight bits which have been delayed most) of the 193 bits stored in register 132-2 are produced as output signals in parallel to NOR gates 133-1 through 133-8 on leads 132e.

Framing signal generating circuit 136-2 receives the master clock signal on lead 136d as its input signal. Using standard techniques circuit 136-2 defines a framing bit every 193 bits of the master clock signal. The framing signal consists of all 1's except for the framing bit which alternates between 1 and 0 according to the standard T1 frame bit pattern discussed for the framing circuit of FIG. 6.

Buffer 137-1, when enabled by a 1 signal on lead 137d from port E of line group central processor (LGCP) 136-4, produces as an output signal the framing signal to line interface circuit 134. This is done as part of the LGCP's initialization sequence following power-up and related steps. During this initialization period, this framing signal (all 1's except for the framing bit) is output to the RCV line 43b and thereby provided as an input signal to line interface 131-2 and, through synchronizer 131-3 to register 132-2.

During initialization, the content of register 132-2 will become all 1's except for the framing bit, since what is sent as an output signal to the RCV line 43b from line interface 134 is routed back to line interface 131-2.

NOR gates 133-1 through 133-8 compare the framing signal on lead 136c from framing signal source 136-2 with the last eight bits of register 132-2. The output signal on each of leads 133a from NOR gates 133-1 through 133-8 will go to a logical 1 only when the input signals to each of these eight NOR gates from register 132-2, framing circuit 136-2 and master clock 136-1 are all 0.

The output signals from NOR gates 133-1 through 133-8 on leads 133a feed the CK input leads of flip-flops 135. A transition from a 0 to 1 on any of these CK input leads 133a will result in a logical 1 on the Q output lead 133b of the corresponding flip-flop. LGCP 136-4 reads these Q output leads via port C and clears them by a signal on lead 135a via port B after reading port C.

During the initialization period, LGCP 136-4 determines which output lead 133b at port C carries a logical 1 consistently each time it is read (about every 600 microseconds). This lead, the location of which corresponds to a bit in the eight bit code word carried by leads 133B, corresponds to the output signal on one of leads 132e from shift register 132-2 which is "frame matched" to the framing signal on lead 136c from framing signal circuit 136-2 derived in turn from the output signal on lead 136d from master clock 136-1. The bit stream from this "frame matched" output signal on leads 133a will have framing and consequently time slots which match those defined by the framing signal on lead 136c from framing signal source 136-2. The particular output signal and output lead 132e from serial to parallel shift register 132-2 which is frame matched will depend on the length of the PAC Line 43a, 43b.

LGCP 136-4 selects via the signals on leads 132d from port A the parallel output signal of register 132-1 which corresponds to the frame matched output signal from register 132-2. This selected output signal transmitted via data selector 132-3 comprises the serial input signal to buffer 137-5.

Once the above frame match selection is completed during the initialization period, the selected output signal from register 132-1 is fed via buffer 137-5 and inverter 137-4 to AND gate 137-3. Inverter 137-4 converts the all 0's pattern which is typical for idle time slots on the XMIT line 43a to all 1's when they are output to the RCV line 43b. The increased density of 1's helps the PIB clock regeneration circuitry in the PIB line interface to regenerate clock. The PIB line interfaces reinvert this signal prior to outputting their ORU RCV signals on lead 520e (FIG. 6). The output signal from AND gate 137-3 will follow the output of inverter 137-4 except when the framing signal goes to a 0 at the framing bit, forcing the output signal from AND gate 137-3 to a 0.

At the end of the initialization period described above, the LGCP 136-4 enables buffer 137-2 and disables buffer 137-1 via signals on lead 137a and 137d from port E, thereby in effect, routing the frame-matched XMIT signal out to the RCV line 43b via line interface 134. Line interface 134 is clocked by the falling edge of the clock pulses on lead 131g derived from master clock 136-1.

The signals on leads 137k, 137p and 137m at port D control the enable lines of buffers 137-5, 137-6 and 137-7. In a single line group system, buffer 137-5 is enabled and buffer 137-7 is disabled. In a multi-line-group system, buffers 137-6 and 137-7 connect via leads 136a and 136b to a space division matrix (SDM) or over a remote interface to a space division matrix. The SDM is an additional Distributed Switching Network (DSN) switching stage for large systems. The SDM will be discussed separately.

OPERATION

For the preferred embodiment of the distributed switching network (DSN) PAC line group structure presently under discussion, the XMIT line 43a is doubled back onto the RCV line 43b via central equipment interface circuit 410 to enable stand-alone operation of this DSN line group embodiment. Interface circuit 410 includes buffering delay to produce framing synchronism which allows the incoming XMIT line 43a signals to be smoothly routed out on the RCV line 43b.

This buffering comprises shift registers 132-1 and 132-2. Each of these registers is 193 bits long, i.e., the length of one T1 frame. The delay in RCV line 43b from line interface 134 back to line interface 131-2 determines which of the parallel outputs of register 132-1 should be selected for doubling back to the RCV line the XMIT line signals which it carries. Since the XMIT and RCV line pulses are aligned in circuit 410 by delay 130, this explanation can be simplified as follows:

The total delay encountered by a signal beginning at the point where XMIT lead 43a enters line interface 131-1, routed through circuit 410 and output to RCV line 43b by line interface 134, and ending at the point where lead 130a delivers RCV signals to line interface 131-2 (this end point corresponds to the beginning point) is made to be one frame (i.e., 193 bits) for purposes of frame synchronization for doubling XMIT line signals back to the RCV line. Register 132-1 (and 132-2) provides 193 bits of delay. Not all 193 of these delay bits of register 132-1 are required for the total desired loop delay figure of 193 bits mentioned above since there is delay elsewhere in the loop. The principal delay variable is length of PAC line 43a, 43b. The longer the PAC line, the fewer of the 193 bits of delay available in register 132-1 that will need to be used to produce total loop delay of 193 bits. Only the last eight parallel outputs are shown for register 132-1, since for most applications PAC line delay will not amount to more than eight bit periods total. (One bit period is 648 nanoseconds in the T1 format.) The proper parallel output lead 132b from register 132-1 (the lead which provides the desired loop delay and enables synchronous doubling back of the XMIT line signal in register 132-1 to the RCV line) can be selected by the method described in SPECIFICATIONS above, or by hand calculation, or by trial and error. However, once this desired parallel output from register 132-1 is chosen, it need not be changed unless the length of the PAC line is changed.

As described in SPECIFICATIONS above, when the network is powered up, the system is initialized by routing the master framed clock signal on RCV line 43b from central interface circuit 410. This procedure gives all of the system line interfaces which must recover clock and framing from the RCV line a signal to lock onto. Once the system is thus initialized, the XMIT line signals (which will generally be all 0's through the initialization period due to all time slots being idle) can be inverted in circuit 410 as described above and output to RCV line 43b in place of the master framed clock signal but frame matched to it. Actually, at the time that the transition is made in which this XMIT signal is output to RCV line 43b in place of the master framed clock by circuit 410, it will be identical to the master framed clock if all XMIT line 43a time slots are idle (since AND gate 137-3 inserts the required framing bit information into the doubled back inverted XMIT line bit stream which is then delivered as an output signal to RCV line 43b by line interface 134). Note that the routing of XMIT line signals out to the RCV line via buffers 137-5 and 137-2, or the alternative routing of master framed clock to the RCV line via buffer 137-1 for initialization as described above can be handled by manual inputting of signals to leads 137a, 137d, 137k, and 137p, or by use of some device other than preferred LGCP 136-4.

Alternatively, in place of routing some or all of XMIT line time slots directly out to the RCV line via circuit 410 in this doubling back procedure, time slot signals can be sent to an additional switching stage from the XMIT line via lead 136a, and time slot signals can be delivered from said switching stage to the RCV line via lead 136b.

Calling A PIB From Another PIB In A Single PAC Line Distributed Switching Network

Introduction

FIG. 4 illustrates a DSN PAC Line group 40. A single PAC Line group can include up to 127 PIB's interfacing to various devices as shown in FIG. 4. The following procedure allows one PIB, such as PIB 45-k to call another PIB, such as 45-l, in its line group and to establish a 64,000-bit-per-second bidirectional communication channel between the two PIB's. This procedure is effective for the entire length of the PAC Line 43a, 43b. That is, any PIB 45 connected to the PAC Line 43a, 43b can call a PIB 45-i (where i is an integer given by $1 \leq i \leq K$ and K is an integer representing the maximum number of PIBs connected in the PAC line group) connected anywhere else along the length of the PAC Line 43a, 43b. User interaction as well as PIB processor software instruction structure for this procedure is as follows. (However, it should be noted that the various actions of PIB processor 530 laid out below comprising the writing of signals to various leads connected to output ports and reading of signals from leads connected to input ports, can be done manually or by a device other than preferred processor 530.)

Figure 7:
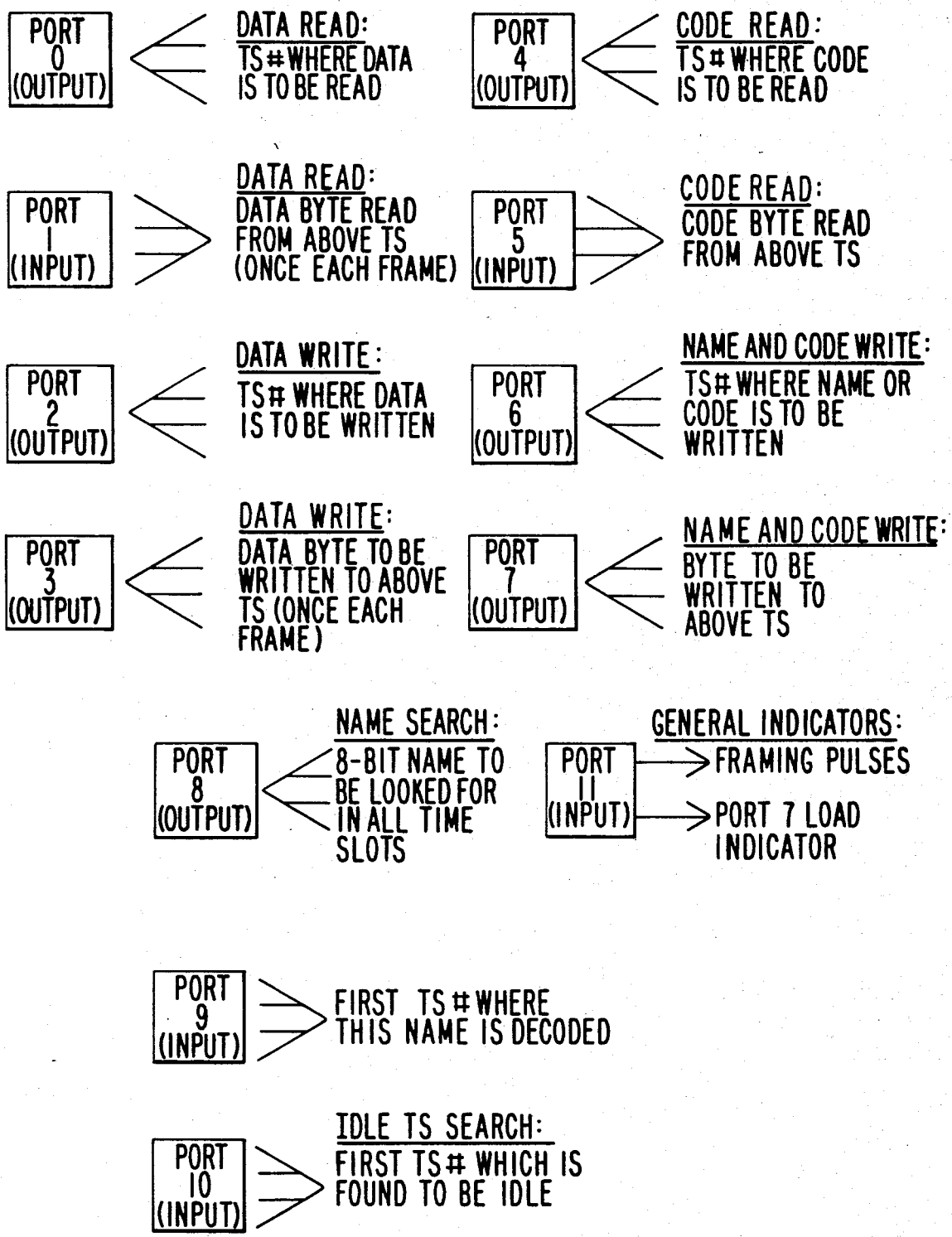
FIG. 7 specifies input and ouput port designation and signal information content for ports illustrated in FIG. 6 showing signal directions with reference to the PIB microcomputer.

Procedure (FIGS. 5, 6 and 7)

The Calling PIB:

1. A user wishing to place a call presses Call button 531 of the PIB 45-i from which he is calling, thereby changing the input to port 14 on microcomputer 530 (FIG. 5) from its inactive to its active state (in the case of a DSN telephone, the telephone's hook-switch can serve as this Call button). PIB microcomputer 530 (FIG. 5) senses the change of state in the Call button when it polls port 14 as a part of its normal monitoring sequence (or an interrupt can be used as is commonly known in the art). Microcomputer 530 then waits for two digits to be punched in from key pad 540.

2. The user then punches two buttons sequentially on decimal key pad 540 (FIG. 5) thereby indicating the number of the PIB to be called. These decimal digits are brought into microcomputer 530 via input leads 537 to port 12 and are stored in one byte as two binary coded decimal (BCD) digits.

3. Microcomputer 530 reads the number of an idle time slot via port 10 which takes input signals on leads 516a (FIG. 6) from idle time slot search and lock circuit 516 (see FIGS. 6 and 9). Microprocessor 530 transmits this time slot number to leads 513c of data, code and name write circuit 513 (FIG. 6) via port 6 and designates this as a NAME write by placing a logical 0 in the MSB of port 6 which then appears as a 0 in the MSB of the output signals on leads 513C.

4. Microprocessor 530 looks up the two-digit eight-bit BCD value representing the to-be-called PIB number in a look-up table contained in its memory to find a corresponding seven-bit binary representation. Since two decimal digits can only represent 100 possible values, seven binary bits are adequate for this purpose since they can represent 128 values. Microprocessor 530 then outputs the signal sequence $0D_6D_5D_4D_3D_2D_1D_0$ to leads 513d at port 7, where $D_0$–$D_6$ represents the seven-bit binary value from the lookup table (representing the eight-bit value it read into memory for two BCD digits). The 0 in the MSB indicates that this is a NAME call rather than a NAME acknowledge (NACK).

5. Optional Transmit Check; Microcomputer 530 reads from the time slot number into which it is writing to make sure the proper NAME is being successfully routed in that time slot. This read operation is done by placing onto leads 514a via port 0 signals representing the time slot number previously placed on leads 513c via port 6 (FIG. 6) and then reading the signals on leads 514b via port 1. If the system is successfully transmitting a NAME call in the specified time slot, microcomputer 530 will read the pattern " . . . NVB, number in port 7, NVB, number in port 7, NVB, etc., . . . " from leads 514b via port 1.

6. Microcomputer 530 produces as an output signal the value $1D_6D_5D_4D_3D_2D_2D_1D_0$ to leads 515a via port 8 where $D_6$–$D_0$ represents the same signal as above in paragraph 4. The 1 in the MSB indicates that microcomputer 530 is waiting for a NAME acknowledge (i.e., an acknowledgement from the PIB which it is calling).

7. Microcomputer 530 polls the signals on leads 515b at port 9 until a time slot number between 0 and 23 is read there (meaning that the called PIB has acknowledged via that time slot). This time slot number is then the time slot which this calling PIB will listen to for conversation with the called PIB.

8. (Optional) When microcomputer 530 receives the name acknowledge (NACK) signal referred to in paragraph 7, microcomputer 530 activates LED 550 via a signal on lead 550a from port 13 to indicate to the user that interprocessor link has been established between the two PIBs. This step is desired for stand-alone PIB's which interface to devices.

The Called PIB:

The normal state at every PIB (when it is not placing a call) is a state of receptivity to being called by another PIB which uses the procedures laid out for the calling PIB above. This state of receptivity to a call, and response when a call is received is as follows:

1. PIB microcomputer 530 outputs via port 8 a signal $0D_6D_5D_4D_3D_3D_2D_1D_0$ to the leads 515a of name search and time slot lock circuit 515 (FIG. 6) where $D_0-D_6$ is the seven-bit representation of the PIB's assigned extension number (NAME) as read from straps 532-1 through 532-7 onto leads 530A into port 15. (Of course, two BCD thumb-wheel switches or equivalent structure could be used instead of the strap shown, if desired.)

2. When microcomputer 530 reads a value between 0 and 23 (i.e., one of the 24 time slots of the T1 based PAC Line) represented by the signals on leads 515b at port 9 (from name search and time slot lock 515, FIG. 6) this indicates that another PIB is calling the NAME of this PIB. To acknowledge the call and complete the connection, microcomputer 530 then reads the number of an idle time slot from the signals on leads 516a of port 10. The microprocessor then writes the number derived from the signals on leads 516a at port 10 onto the leads 513c at port 6 and clears the MSB at port 6 to 0 (indicating that a NAME or a name acknowledge will be transmitted in the time slot number read from port 10). It then outputs the signal 1 $D_6D_5D_4D_3D_2D_1D_0$ to the leads 513d at port 7 where 1 in the MSB indicates a NACK signal and $D_0-D_6$ is the seven-bit representation of its own NAME. (Since the calling PIB processor is looking for this NACK in all time slots, it will lock onto the time slot containing this NACK.)

PIB Interconnection

Once a PIB 45-k (FIG. 4) has been called and has acknowledged that call as described above, both the calling PIB and called PIB will be locked to time slots through which they can talk and listen to each other. The talk time slot for the calling PIB is the listen time slot for the called PIB and vice versa. By placing its "talk" time slot number on leads 513a via port 2 and its "listen" time slot number on leads 514a via port 0 (FIG. 6) each PIB will have a 64,000-bit-per-second full duplex link to the other. The associated PIB microcomputers 530 can continue optional coded communication or the 64,000-bit-per-second link can be turned over to the users for voice (via codec) or data communications (via connecting devices as shown in FIG. 4). Optional code communication between PIB processors can be conducted using ports 4–7 for reading and writing of code patterns which can be given common interpretation in the programming of all PIB microcomputers, with codes consisting of a byte of data alternated with the CVB pattern as was described above. Other PIB embodiments can use codes extending for more than 8 bits, e.g., a number of consecutive frames of a particular time slot, or a number of different time slots. Other embodiments can mix CVB bits with code bits in the same time slot. (The same can be done with name and NVB bits.)

By placing a logical 1 (i.e., a high logic state) on select pin 522d which drives lead 522b, the user can transmit one byte per frame via leads 522c (FIG. 5) and receive one byte per frame on leads 510c (FIG. 5) for a total of 64,000 bits per second of both transmit and receive. The output signals from leads 510a, 510b, and 510c are made available to the user via the PAC logic interface circuit pinout as shown in FIG. 5. This allows the user to read that information directly. Microcomputer 530 can also read these ports via the I-O port multiplex and decode circuit 512 of FIG. 6.

The input signals on lines 513b (FIG. 6) can be provided for the PAC logic interface circuit by either microcomputer 530 via port 3 or by the user directly via the PAC logic interface circuit pinout lines 522c. A user who wishes to provide these input signals for data transmission places a 1 on lead 522b as described above. This can be done using a switch or strap or other commonly used methods. In the case of DSN telephones, PIB microcomputer 530 can control the state of select line 522b by having an output port lead connected to lead 522b. An unused bit from port 3 (FIG. 6) or a separate port can be connected in this way as is well known in the art.

Referring to FIG. 5, the use of leads 510c, 522c, and pins 522d as shown on the parallel access communications logic interface circuit 510 allows a voice communication channel to be established (with signals of leads 522c and 510c routed through a codec) after the PIB microprocessor 530 sets up a connection with another PIB as described above. Actually, this feature allows the PIB to provide access to a 64,000 bits per second data path which can be used in any way in which the user desires. Common techniques in the art can be used to multiplex numerous data streams having common formats such as RS-232c onto this 64,000 bit per second path.

By writing 11111111 (or any other byte which does not represent a time slot number) to ports 0, 2, 4 and 6 a PIB processor 530 can terminate any connections it has established with other PIB processors over XMIT and RCV line time slots. In a typical embodiment such termination will occur as a result of a change-of-state in Call button 531, such as the user indicating to processor 530 via Call button 531 that he wants to terminate a connection. Prior to such disconnection, typically a termination Code will be sent (in the technique discussed above for Code) by the disconnecting PIB processor to another PIB processor to which it has a connection, indicating that the disconnecting PIB processor is going to terminate its connection to this second PIB processor.

The use of leads 510c and 522c in the manner disclosed above allows a user to set up any protocols which he desires for full communication between devices which interface with the PIB. It should be emphasized that this invention establishes high speed switched data transmission channels between widely dispersed devices. These channels can be used by the user in any way the user desires. Embodiments of the present invention can provide links much higher than 64,000 bits per second where required. Multiple time slots can be seized by a single PIB in some embodiments. Much higher speed transmission formats than T1 can be used.

T1 has been selected as a preferred transmission format at present due to its wide acceptance in the industry. Transmission schemes such as T1c, duobinary, and higher speed formats can of course be used in embodiments of the present invention. With the extremely wide bandwidth available in fiber optics transmission in the art, some embodiments of this invention can use frames having a very large number of time slots so that each PIB can have one or more time slots allocated to it, rather than seizing any idle time slots.

Another significant feature of the invention is the novel way in which the PAC line itself is structured. This line allows us to distribute the time division multiplexing over space. By having the PIB terminals spread out in space, each terminal acts as its own switch to lock on to time slots for receiving information and for transmitting information. This is possible because of the synchronization of all systems connected to the PAC line.

For added reliability and fail-safe operation many embodiments of this invention will employ redundancy in the central equipment discussed above using methods known in the art. Some embodiments will also employ redundancy in the PAC line.

Although the above discusses a person operating the buttons of a PIB 45 to call another PIB 45, the same basic procedure can be used without human intervention, allowing one device to call another device via the network. For example, instead of having an individual push buttons on a key pad, a processor (either the PIB microcomputer or another outside computer or intelligent device processor) can easily be programmed to input selected values to the required ports as described above to make a call without any buttons being pushed and without the presence of a person. such programming would allow computers to call each other to exchange information and similar-type transactions.

The present invention also enables the integration of packet and circuit switching techniques in a distributed time division multiplexed network. Packet switching as described in the discussion above for FIG. 1b, can be allocated in this invention to particular time slots while other time slots are used for circuit switching as laid out in detail in the above discussion of this invention. For example, in a demonstrative embodiment of this integration technique of the present invention a particular bit pattern can be inserted onto the RCV line or its associated framed timing reference line as described above to delineate idle time slots which can be used for circuit switching. (The bit pattern 11111111 was listed as the idle time slot delineator transmitted on the RCV line by the central equipment interface in the detailed embodiment description given above. This pattern provides ample 1's density to assist each PIB in recovering clock from the RCV line and the 11111111 signal, when inverted in the PIB PAC line interface, produces a 00000000 signal which is interpreted by PIB's as the code for idle time slot when repeated 64 times in the preferred embodiment. Obviously any other bit pattern could be selected to represent idle time slots in the invention for other embodiments.) To implement packet switching a second bit pattern can be inserted on the RCV line or its associated framed timing reference line in this invention to delineate time slots which can be used for packet switching. PIB's can then define the use of an idle time slot by which pattern it carries. A system of the present invention can, for example, be configured in which PIB's use certain time slots in the packet switched mode for signalling and some data transmission and other time slots in the circuit switched mode for voice and some types of data services. Said signalling could in some applications constitute messages from one PIB (or from central equipment) to a second PIB in which said second PIB is told to listen or talk to particular time slots for circuit switched communication with said first PIB or another piece of equipment.

Other embodiments of the invention can reserve certain time slots via unique idle codes or PIB programming for certain classes of devices or for specific devices.

Some embodiments can utilize redundancy in the PAC line structure, central equipment, or PIB line interfaces of this invention to provide added reliability. Such redundancy (e.g. PAC line duplication) can utilize load share or hot stand-by techniques as known in the art.

It should be noted here that the term "frames" as applied to this invention can be any number of bits long, and "time slots" within frames can also be any number of bits. For example, one bit time slots can be used in an embodiment of this invention which uses delta modulation techniques as known in the art.

It should be further noted that the term "byte" as used herein implies a group of bits, and is not restricted to mean exactly eight bits.

FIG. 15 illustrates a technique for interconnecting the DSN PAC line groups of this invention. A space division matrix (SDM) 151 constitutes a central hub to which a number of PAC line groups can connect, e.g., by means of their central equipment interface circuit 410 leads 136a and 136b (FIG. 13). Line group connections to the SDM can be handled via time slot interchangers (TSI) 155 known in the art. The SDM 151 provides pathways via tri-state buffers 152i enabling a line group connecting to SDM 151 via leads 153a-k and 153b-k to link with all other line groups (or other SDM's) which connect to SDM 151 via leads 153a-i and 153b-i. These links can be established and broken in real time under the control of matrix processor 154, thereby allowing the various line groups 153i to exchange information via time slots. Matrix processor 154 can control exchanges of time slot signals between the line groups 153i by controlling time slot interchangers 155i and enable leads 156i of buffers 152i via the input output port structure (not shown but common in the art) of matrix processor 154.

In the preferred embodiment of PAC line 43a, 43b a standard digital transmission format such as T1 PCM is used. This makes it easy and inexpensive to interface PAC line 43a, 43b to standard digital transmission trunks for remote connection of a DSN PAC line group to a space division matrix at a distant site which can be used to tie together many DSN PAC line groups in a single network. For instance, leads 136a and 136b (FIG. 13) can be connected to a remote interface shelf (FIG. 16) which interfaces these signals to a T1 transmission line using methods common in the art. This T1 transmission line can be routed any desired distance and terminated at another remote interface shelf at the site of the SDM to which it delivers its output signals on an SDM input lead 153a and from which it receives its input signals from an SDM output lead 153b (FIG. 15). T1 trunks can be used in this way to interconnect multiple SDM's via SDM leads 153a and 153b as well as for interconnecting a number of PAC line groups as described above.

The interconnection of multiple PAC line groups described above can also be accomplished using a centralized time division switching stage (rather than an SDM and TSI's as described above) or by using other combinations of space division and time division switching stages.

From the above description it will be apparent that this system contains numerous unique features which give to the system a degree of flexibility and reliability heretofore unachieved. Thus it will be apparent from the above description that should one of the interface units (called PAC interface blocks) fail and be unable to receive signals on the transmission means designated for that particular PIB, then the remaining PIBs will continue to operate. Naturally, noneof the remaining PIBs will be able to communicate with the failed unit. The particular connection structure disclosed in this specification by which this is achieved with respect to each PIB, is referred to as a parallel connection between the PIB and the transmission means. This parallel connection by way of definition, includes a system wherein each PIB transmits signals to the transmission means for transmission to other PIBs but each PIB does not necessarily transmit the totality of the signals on the transmission means. Thus by parallel connection, it is clear that the remaining PIBs will continue to function under normal circumstances despite the failure of a given PIB.

Another advantage of this invention is that an embodiment of the invention can employ frequency division instead of time division wherein the time slots defined above can be replaced by different frequencies. Of course, analog samples can also be used in place of digital samples in other embodiments.

I claim:

1. Structure comprising
   transmission means for carrying signals divided into frames, said frames being divided into a plurality of time slots; and
   at least three means for interfacing selected equipments to said transmission means whereby each of said at least three means for interfacing is capable of receiving selected signals carried on said transmission means and of delivering intermediate signals derived from said selected signals to a corresponding one of said equipments, and of transmitting second signals to said transmission means;
   wherein each of said means for interfacing includes means for selecting any one of said plurality of time slots into which said means for interfacing can transmit said second signals;
   wherein each of said means for interfacing is connected in parallel to said transmission means such that the failure of one or more means for interfacing does not prevent the operation of the remaining means for interfacing, and
   wherein said transmission means comprises
   a transmit line capable of carrying said signals divided into frames;
   a receive line capable of carrying said signals divided into frames;
   means for transferring signals from said transmit line to said receive line;
   means for transmitting a first framed timing reference signal in the same direction as that signal on the transmit line which is ultimately transferred to the receive line;
   means for transmitting a second framed timing reference signal in the same direction as the signal on said receive line;
   wherein said first framed timing reference signal and said second framed timing reference signal are carried by the same line, and further, wherein each of said means for interfacing includes
   means for receiving second signals transmitted onto said transmission means by another of said at least three means for interfacing,
   means for delivering to said transmission means second signals to be received by said another of said at least three means for interfacing, and
   means for establishing a connection between two of said at least three means for interfacing,
   wherein at least one of said at least three means for interfacing includes means for interpreting said signals transmitted onto said transmission means by another of said at least three means for interfacing and received by said at least one of said at least three means for interfacing as comprising an address code which is interpreted by said at least one of said at least three means for interfacing to have specific meaning, and further
   wherein said address code is contained in repetitions of said time slot a multiple of times before it is interpreted by said at least one of said at least three means for interfacing as code.

2. Structure as in claim 1 wherein each of said means for interfacing includes means for receiving second signals transmitted onto said transmission means by another of said at least three means for interfacing and means for delivering to said transmission means second signals to be received by said another of said at least three means for interfacing.

3. Structure as in claim 2 wherein said structure includes means for establishing a connection between two of said at least three means for interfacing.

4. Structure as in claim 3 wherein at least one of said at least three means for interfacing includes means for interpreting said signals transmitted onto said transmission means by another of said at least three means for interfacing and received by said at least one of said at least three means for interfacing as comprising a selected code which is interpreted by said at least one of said at least three means for interfacing to have specific meaning.

5. Structure as in claim 4 wherein said selected code is repeated in repetitions of at least one of said time slots a multiple of times before it is interpreted by said at least one of said at least three means for interfacing as code.

6. Structure as in claim 1 wherein a number of code verification bits are included in time slot signals transmitted by a first of said at least three means for interfacing;
   and wherein said code verification bits are interpreted by said at least one of said at least three means for interfacing to mean that certain other bits associated with said code verification bits are code bits.

7. Structure comprising
   transmission means for carrying signals divided into frames, said frames being divided into time slots; and
   at least three means for interfacing selected equipments to said transmission means whereby each of said at least three means for interfacing is capable of receiving selected signals carried on said transmission means and of delivering intermediate signals derived from said selected signals to a corresponding one of said equipments, and of transmitting second signals to said transmission means;

wherein each of said means for interfacing includes means for selecting any one of a plurality of time slots of said transmission means into which said means for interfacing can transmit said second signals;

wherein each of said means for interfacing is connected in parallel to said transmission means such that the failure of one or more means for interfacing does not prevent the operation of the remaining means for interfacing;

wherein each of said means for interfacing includes means for detecting a time slot determination signal specifying a time slot location in a sequence of said frames from which said means for interfacing is to receive signals, and wherein said transmission means comprises:
- a transmit line capable of carrying said signals divided into frames;
- a receive line capable of carrying said signals divided into frames;
- means for transferring said signals divided into frames from said transmit line to said receive line;
- means for transmitting a first framed timing reference signal in the same direction as that signal on the transmit line which is ultimately transferred to the receive line; and
- means for transmitting a second framed timing reference signal in the same direction as the signal on said receive line;
- wherein said first framed timing reference signal and said second framed timing reference signal are carried by the same line.

8. Structure as in claim 7 wherein said time slot determination signal comprises a name assigned to said means for interfacing.

9. Structure as in claim 7 wherein said time slot determination signal comprises a name representing another means for interfacing.

10. Structure as in claim 7 wherein said means for interfacing looks for said time slot determination signal in said framed stream of signals;

11. Structure as in claim 7 wherein said time slot determination signal originates at another of said means for interfacing.

12. Structure as in claim 10 wherein said time slot determination signal comprises a format determination signal which indicates the format of the information to be provided in said specified time slot location.

13. Structure as in claim 12 wherein said format determination signal indicates that said specified time slot location is for circuit switched communications.

14. Structure as in claim 12 wherein said format determination signal indicates that said specified time slot location is for packet switched communications.

15. Structure as in claim 7 wherein said transmit line and said receive line are the same line.

16. Structure as in claim 25 wherein said transmit line and said receive line are different lines.

17. Structure as in claim 7 including means for modifying transmit line signals prior to the transfer of said signals to said receive line.

18. Structure as in claim 7 wherein said line carrying said first timing reference signal and said second timing reference signal is said receive line.

19. Structure as in claim 7 wherein said line receiving said first timing reference signal and said second timing reference signal is a line routed alongside said receive line.

20. Structure as in claim 7 wherein said first and said second framed timing reference signals are the same signal carried by a single line.

21. Structure as in claim 7 wherein a circuit switched connection is established between a first of said means for interfacing and a second of said means for interfacing via said transmit line and said receive line.

* * * * *